US008289560B2

(12) United States Patent
Mizutani et al.

(10) Patent No.: US 8,289,560 B2
(45) Date of Patent: Oct. 16, 2012

(54) TRANSPARENCY AND OVERLAY PROCESSING FOR PRINT DATA

(75) Inventors: Norio Mizutani, Mie (JP); Kunihiko Sakurai, Gifu (JP); Kousuke Fukaya, Aichi (JP); Sadaaki Miyazaki, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 955 days.

(21) Appl. No.: 11/768,451

(22) Filed: Jun. 26, 2007

(65) Prior Publication Data

US 2007/0296749 A1    Dec. 27, 2007

(30) Foreign Application Priority Data

Jun. 26, 2006    (JP) ................... 2006-175419

(51) Int. Cl.
*B41J 29/38* (2006.01)
(52) U.S. Cl. ...................................... 358/1.18
(58) Field of Classification Search .................. 358/1.18
See application file for complete search history.

(56) References Cited

U.S. PATENT DOCUMENTS

| 6,020,897 | A | 2/2000 | Carlsen et al. |
| 6,025,927 | A * | 2/2000 | Honma ......................... 358/1.18 |
| 6,313,847 | B1 | 11/2001 | Carlsen |
| 2004/0017378 | A1 * | 1/2004 | Lin et al. ....................... 345/592 |

FOREIGN PATENT DOCUMENTS

| JP | 11272252 | 10/1999 |
| JP | 11286150 | 10/1999 |
| JP | 11-355588 | 12/1999 |
| JP | 2000-022943 | * 1/2000 |
| JP | 2001202495 | 7/2001 |
| JP | 2002-120416 | 4/2002 |
| JP | 2007-122621 | 5/2007 |

OTHER PUBLICATIONS

Japanese Office Action, Application No. 2006-175419, Ref No. 2005-02145, Dated May 20, 2008.

* cited by examiner

*Primary Examiner* — Benny Q Tieu
*Assistant Examiner* — Qian Yang
(74) *Attorney, Agent, or Firm* — Banner & Witcoff, Ltd.

(57) ABSTRACT

There is provided a printing device which comprises a print data receiving unit, a transparent property judgment unit, a transparency processing unit, a transparency processing buffer which stores the transparency-processed data generated in the transparency processing, an image data generating unit configured to generate image data based on at least one of the transparency-processed data and the objects, an image data storage control unit, a print engine, and an object placement judgment unit which regards the page memory as a set of bands defined as prescribed areas and judges in which bands each of the objects is to be placed by use of the objects. The transparency processing unit judges whether to execute the transparency processing for a band based on whether the band is judged by the object placement judgment unit to have at least a part of a transparent object.

15 Claims, 15 Drawing Sheets

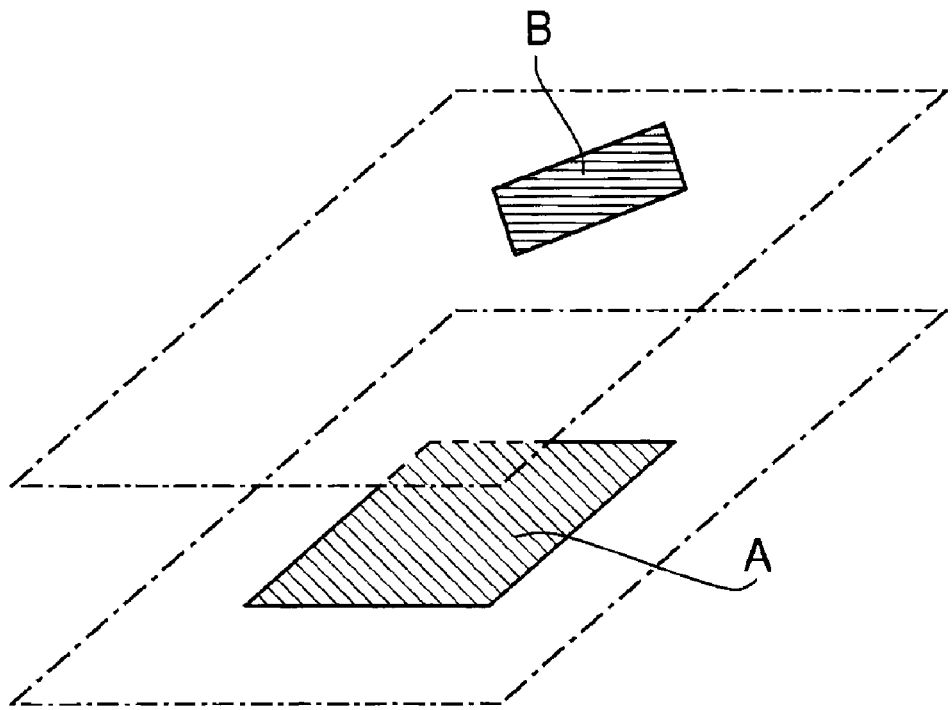
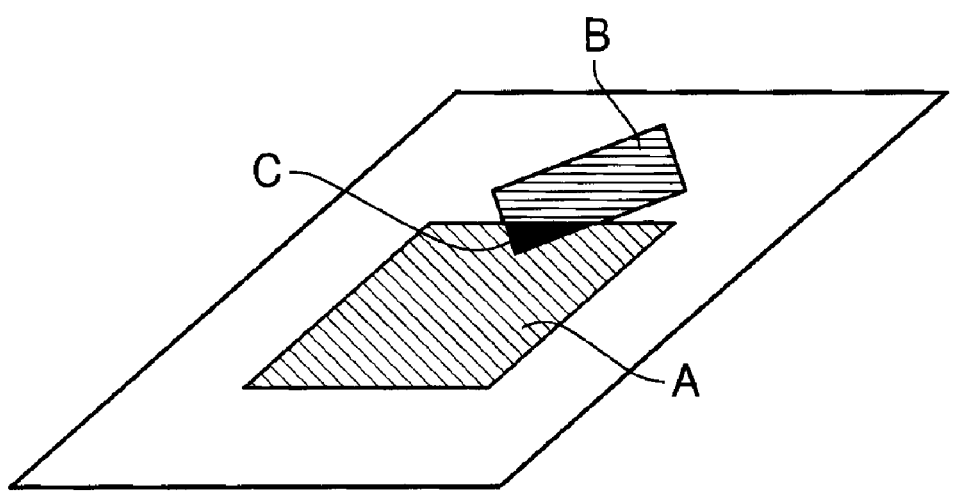
FIG.14

TRANSPARENCY AND OVERLAY PROCESSING FOR PRINT DATA

CROSS-REFERENCE TO RELATED APPLICATION

This application claims priority under 35 U.S.C. §119 from Japanese Patent Application No. 2006-175419, filed on Jun. 26, 2006. The entire subject matter of the application is incorporated herein by reference.

BACKGROUND

1. Technical Field

Aspects of the invention relate to a printing device which prints out print data including two or more objects by combining (stacking up) the objects while executing transparency processing for incorporating a transparent property (which can have been added to each object) into the combining of the objects, and in particular, to the speeding up and memory conservation of such a printing device executing the printing process including the transparency processing.

2. Related Art

A computer is capable of outputting data to various types of output devices such as printers. In recent years, an increasing amount of data described in PDLs (Page Description Languages), such as PDF (Portable Document Format® data, are being used, processed by computers, and outputted to printing devices.

The increasing use of PDLs comes from their device independence, that is, PDLs have the advantage of allowing the user to output data to output devices through a viewer operating on a computer independently of the OS (Operating System) installed in the computer. With this advantage, a document created with a PDL can be equally outputted from various computers as long as the computers are each equipped with a viewer. Similarly, a document created with a PDL can be equally printed out by various printers.

The PDL specifies the arrangement of characters, figures, etc. in each "page" which is handled as a target of display and printing. Such PDL data created with a PDL in many cases includes two or more objects (fonts, images, etc.) stacked up, in which an object overlaid on another object can have the transparent property. When an object having the transparent property is overlaid on another object, the color of the overlapping part (where both objects exist) varies depending on the degree of transparency which has been set to the upper object. Therefore, in order to output PDL data including such an overlapping part (where an upper object having the transparent property overlaps with a lower object), the so-called "transparency processing" has to be executed for the upper and lower objects.

The outline of the transparency processing is schematically shown in FIGS. 14 and 15. FIG. 14 is a conceptual diagram for explaining the printing of PDL data 60 including two objects. The PDL data 60 includes two objects: a first object A and a second object B which has the transparent property. When the second object B having the transparent property is drawn (overlaid) on the first object A, the overlapping part C is expressed with a color that is obtained by overlaying the color of the second object B (with the degree of transparency set to the second object B) on the color of the first object A. Thus, such an overlaying process (combining process) is realized by executing the transparency processing.

As a result, at the stage when the PDL data 60 is finally printed out, the two objects are printed on a print medium (e.g. paper) with the second object B (having the transparent property overlaid) on the first object A.

FIG. 15 is a conceptual diagram showing tasks executed in the transparency processing of PDL data. First, the PDL data 60 is stored in an intermediate data storage area 61 (reserved in a memory such as a RAM) as intermediate data. In this example, two pieces of intermediate data (first object A, second object B) are formed in the intermediate data storage area 61.

Subsequently, the transparency processing of the first and second objects A and B is executed in an area (called "transparency processing buffer 63") reserved in the memory, separately for each of four layers corresponding to the four colors C (Cyan), M (Magenta), Y (Yellow) and K (blacK). In the transparency processing, the objects (data) in each layer are processed in many cases as 8-bit data for 256-step gradation.

Subsequently, the data obtained in the transparency processing buffer 63 is developed into a page memory area 64, and the developed image data is handed over to a print engine to be printed out. Since the page memory area 64 is required to be in a format that can be processed by the print engine, the data in each layer of the page memory area 64 is in many cases 2-step gradation data (having bit depth of 1 bit).

The details of the above methods are described in Japanese Patent Provisional Publication No. HEI 11-272252 (hereinafter referred to as a JP11-272252A), and Japanese Patent Provisional Publication No. HEI 11-286150 (hereinafter referred to as a JP11-286150A).

However, such conventional printing techniques have the disadvantage of slow printing speed in the printing of PDL data including a transparent object.

In the aforementioned example, the PDL data 60 including the second object B having the transparent property can not be directly developed into the page memory area 64; it is necessary to first execute the transparency processing to the PDL data 60 in the printer and thereafter develop the transparency-processed data into the page memory area 64. In short, a process like the one shown in FIG. 15 has to be executed in a printer.

Incidentally, PDL data 60 has to be processed in units of pages due to the nature of the data. However, the memory installed in an ordinary printer is generally designed considering the storing (reservation) of the page memory area 64 which is configured to have the 1-bit depth, and thus reserving areas for processing data having bit depth of 8 bits (intermediate data storage area 61, transparency processing buffer 63) requires a large free space in the memory. For example, just reserving the transparency processing buffer 63 requires a free space (per page) eight times that for the page memory area 64. For this reason, such a printer executing the transparency processing is required to be equipped with a memory of large storage capacity.

For the reason described above, the printing of PDL data including a transparent object needing the transparency processing can take an extremely long time when the printing process is executed by the CPU, the memory, etc. of an ordinary printer.

The printing speed can of course be increased by equipping a printer with a high-power CPU and a high-capacity memory to realize a higher data processing speed (throughput per unit time). However, the installation of such high-performance components in a printer is difficult since the CPU and the memory are especially expensive components which can drive up the manufacturing cost of the printer.

As explained above, the methods described in JP 11-272252A and JP 11-286150A involve the problems of slow printing speed in the printing of PDL data including a transparent object and high costs necessary for the implementation of high-speed printing of such PDL data.

SUMMARY

Aspects of the invention are advantageous in that a printing device, capable of executing the printing of print data including a transparent object at high speed and without needing high costs, can be provided.

BRIEF DESCRIPTION OF THE ACCOMPANYING DRAWINGS

FIG. 14 is a conceptual diagram for explaining the printing of PDL data including two objects.

DETAILED DESCRIPTION

General Overview

Figure 1:
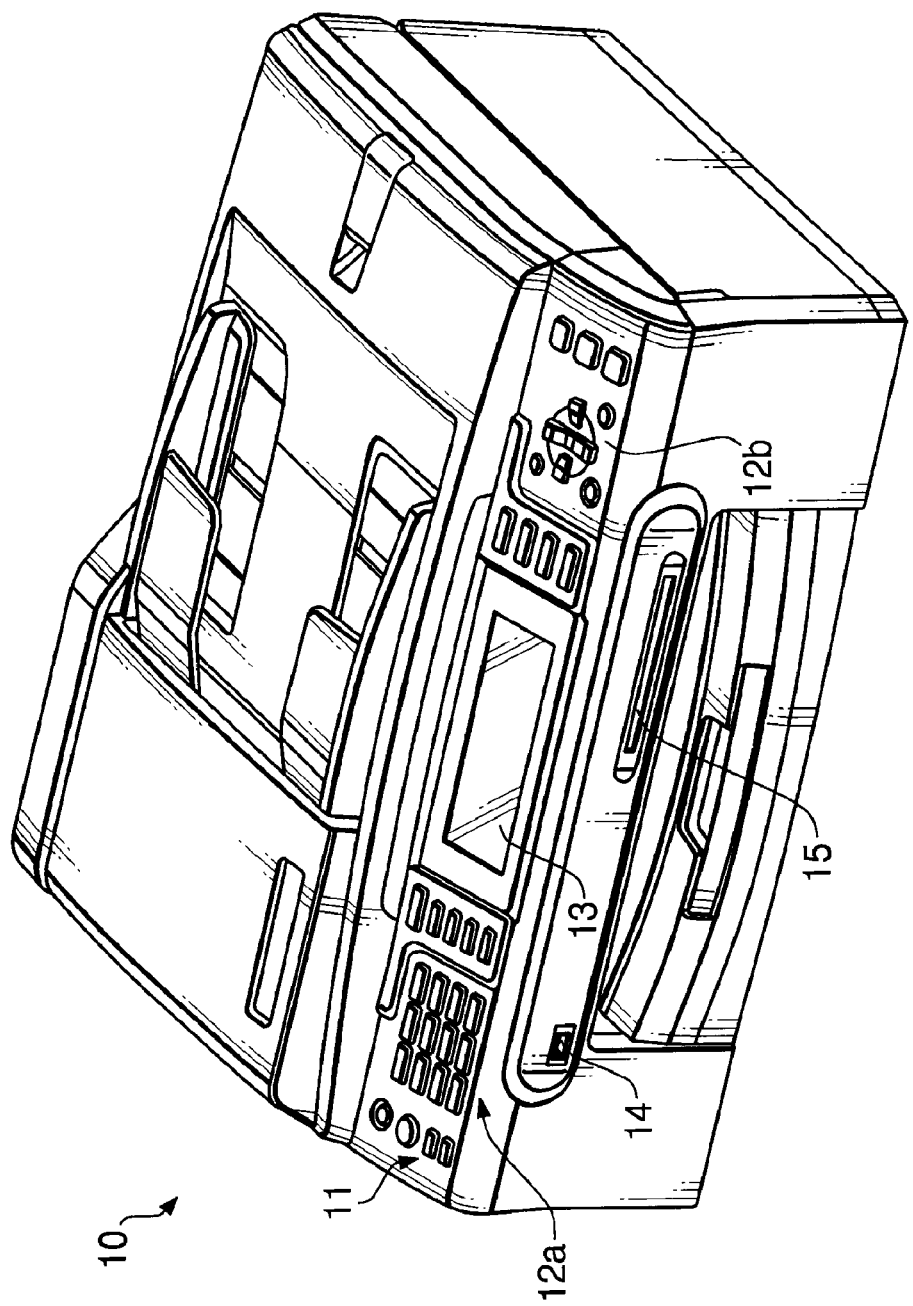
FIG. 1 is a perspective view showing a printer as a printing device in accordance with a first embodiment.

In accordance with an aspect of the present invention, there is provided a printing device, which comprises a print data receiving unit configured to receive print data, including multiple objects and accompanying information corresponding to at least one of the objects; a transparent property judgment unit configured to judge whether each of the objects is a transparent object having a transparent property or not by use of the accompanying information; a transparency processing unit configured to generate transparency-processed data by executing transparency processing on the objects; a transparency processing buffer which stores the transparency-processed data generated in the transparency processing; an image data generating unit configured to generate image data based on at least one of the transparency-processed data and the objects; an image data storage control unit which stores the image data in a page memory; a print engine which prints an image on a print medium by use of the image data stored in the page memory; and an object placement judgment unit which regards the page memory as a set of bands defined as prescribed areas and judges in which bands each of the objects is to be placed by use of the objects. In this configuration, the transparency processing unit judges whether to execute the transparency processing for a band based on whether the band is judged by the object placement judgment unit to have at least a part of a transparent object.

Such a configuration of the printing device makes it possible to execute the transparence processing only for a band having at least a part of a transparent object. Therefore, the processing speed for generating image data can be increased.

In at least one aspect, the transparency processing unit executes the transparency processing for each band satisfying a first condition that a transparent object recognized by the transparent property judgment unit is judged by the object placement judgment unit to be placed partially or totally in the band, by use of objects to be placed partially or totally in the band and thereby generates the transparency-processed data regarding the band. The transparency processing buffer stores the transparency-processed data regarding each band satisfying the first condition. In this case, the image data generating unit generates the image data regarding each band satisfying the first condition based on the transparency-processed data regarding the band stored in the transparency processing buffer, while generating the image data regarding each band not satisfying the first condition by use of objects to be placed partially or totally in the band.

With the printing device configured as above, the page memory is regarded as a set of bands and the judgment (in which bands each of the objects is to be placed) is made by use of the accompanying information by the object placement judgment unit. For each band (needing the transparency processing) in which a transparent object having the transparent property is to be placed partially or totally (i.e. only for each band satisfying the first condition), the transparency processing is executed by the transparency processing unit, the transparency-processed data generated in the transparency processing is stored in the transparency processing buffer, the image data is generated by the image data generating unit based on the transparency-processed data, and the image data is stored in the page memory by the image data storage control unit. Meanwhile, for each band in which no transparent object having the transparent property is to be placed partially or totally (i.e. for each band not satisfying the first condition), the image data is directly generated from the objects included in the print data by the image data generating unit and stored in the page memory by the image data storage control unit.

By separating the bands into those needing the transparency processing and those not needing the transparency processing as above, the bands not needing the transparency processing can be processed faster, by which the print data including a transparent object can be processed at high speed.

In other words, it is possible to shorten the time from the start to the completion of the printing process by the omission of the transparency processing for each band in which no object having the transparent property is to be placed partially or totally, compared to printing methods executing the transparency processing for the whole of each page.

Further, thanks to the processing in units of bands, the size of the memory (transparency processing buffer) necessary for the transparency processing can be reduced to 1/20 when each page (the page memory) is divided into 20 bands, for example, by which memory-saving processing (memory conservation) becomes possible.

In at least one aspect, the printing device further comprises a band information storage unit which stores band information on each band such as object number information indicating the number of objects judged by the object placement judgment unit to be placed partially or totally in the band and transparent object presence/absence information indicating whether or not there exists a transparent object recognized by the transparent property judgment unit that is to be placed partially or totally in the band. The transparency processing unit executes the transparency processing for each band whose band information stored in the band information storage unit indicates that two or more objects are to be placed partially or totally in the band and at least one transparent object is to be placed partially or totally in the band.

With the printing device configured as above, the effects described above can be achieved with reliability by the management of the object number information (indicating the number of objects to be placed partially or totally in each band) and the transparent object presence/absence information (indicating whether or not there exists a transparent object to be placed partially or totally in each band) on each band by use of the band information storage unit. Further, it is possible to prevent simultaneous execution of the transparency processing, the process judging whether each object is to be placed (partially or totally) in each band or not and the process judging whether each object has the transparent property or not, slowing down of each process, and simultaneous use of resources by the processes.

In at least one aspect, the printing device further comprises an overlap judgment unit which judges whether or not a transparent rectangular area, defined as the smallest rectangular area having two X sides parallel to one side of the image and two Y sides orthogonal to the X sides and surrounding all parts of transparent objects situated inside a band, overlaps with a base rectangular area defined as the smallest rectangular area having two X sides and two Y sides and surrounding all parts of nontransparent objects situated inside the band, in regard to each band by use of the accompanying information and the judgment by the object placement judgment unit. In this case, the transparency processing unit executes the transparency processing for each band satisfying a second condition that the transparent rectangular area in the band is judged by the overlap judgment unit to overlap with the base rectangular area in the band, by use of objects to be placed partially or totally in the band and thereby generates the transparency-processed data regarding the band. The transparency processing buffer stores the transparency-processed data regarding each band satisfying the second condition. The image data generating unit generates the image data regarding each band satisfying the second condition based on the transparency-processed data regarding the band stored in the transparency processing buffer, while generating the image data regarding each band not satisfying the second condition by use of objects to be placed partially or totally in the band.

With the printing device configured as above, the page memory is regarded as a set of bands and the judgment (in which bands each of the objects is to be placed) is made by use of the accompanying information by the object placement judgment unit. Whether the transparent rectangular area (defined as the smallest rectangular area having two X sides parallel to one side of the image and two Y sides orthogonal to the X sides and surrounding all parts of transparent objects situated inside a band) overlaps with the base rectangular area (defined as the smallest rectangular area having two X sides and two Y sides and surrounding all parts of nontransparent objects situated inside the band) or not is judged by the overlap judgment unit in regard to each band in order to check whether each band actually needs the transparency processing or not. For each band (needing the transparency processing) in which the transparent rectangular area overlaps with the base rectangular area (i.e. for each band satisfying the second condition), the transparency processing is executed by the transparency processing unit, the transparency-processed data generated in the transparency processing is stored in the transparency processing buffer, the image data is generated by the image data generating unit based on the transparency-processed data, and the image data is stored in the page memory by the image data storage control unit. Meanwhile, for each band not satisfying the second condition, that is, for each band not including a transparent object and for each band including a transparent object but not including an overlapping part between the transparent rectangular area and the base rectangular area, the image data is directly generated from the objects included in the print data by the image data generating unit and stored in the page memory by the image data storage control unit.

Even when a layer of a transparent object is overlaid on a layer of another object, there is a possibility that the two objects have no overlapping part. In consideration of such cases, whether the transparency processing is necessary for each band or not is judged more specifically, by expressing parts of transparent objects and nontransparent objects situated in each band by use of the transparent rectangular area and the base rectangular area respectively and making the judgment on the overlap between the two rectangular areas as above. By the omission of the transparency processing for a band when there is no overlapping part between the transparent rectangular area and the base rectangular area in the band, the printing process can be speeded up further.

In at least one aspect, the printing device further comprises a band information storage unit which stores an overlap flag, indicating whether or not the transparent rectangular area overlaps with the base rectangular area according to the judgment by the overlap judgment unit, in regard to each band. The transparency processing unit executes the transparency processing for each band whose overlap flag stored in the band information storage unit indicates that the transparent rectangular area overlaps with the base rectangular area.

With the printing device configured as above, the effects described above can be achieved with reliability by the management of the overlap flag regarding each band by use of the band information storage unit. Further, it is possible to prevent simultaneous execution of the transparency processing and the process judging whether the transparent rectangular area overlaps with the base rectangular area or not, slowing down of each process, and simultaneous use of resources by the processes.

In at least one aspect, the transparency processing buffer is reserved just before the transparency processing is started for each band by the transparency processing unit and released just after the transparency processing is finished for each band by the transparency processing unit.

With the printing device configured as above, the transparency processing buffer is reserved and released in sync with the start and end of the transparency processing for each band, by which the length of the time with the transparency processing buffer reserved in memory (e.g. RAM) can be minimized and the possibility of shortage of memory for other processes can be reduced.

In at least one aspect, the printing device further comprises a transparency processing buffer reserving unit which reserves the transparency processing buffer based on size of an overlap rectangular area which contains both the transparent rectangular area and the base rectangular area. The transparency processing unit executes the transparency processing for each band satisfying the second condition by use of objects to be placed partially or totally in the band and thereby generates transparency-processed data just for the overlap rectangular area as the transparency-processed data regarding the band. The transparency processing buffer stores the transparency-processed data generated just for the overlap rectangular area as the transparency-processed data regarding each band satisfying the second condition. The image data generating unit generates the image data regarding each band satisfying the second condition based on the transparency-processed data of the overlap rectangular area stored in the transparency processing buffer, while generating the image data regarding each band not satisfying the second condition by use of objects to be placed partially or totally in the band.

With the printing device configured as above, the transparency processing buffer for each band is reserved by the transparency processing buffer reserving unit based on the size of the overlap rectangular area which contains both the transparent rectangular area and the base rectangular area. For each band needing the transparency processing (i.e. for each band satisfying the second condition), the transparency-processed data just for the overlap rectangular area is generated by the transparency processing unit by use of the transparency processing buffer reserved based on the size of the overlap rectangular area, the image data is generated by the image data generating unit based on the transparency-processed data of the overlap rectangular area, and the generated image data is developed into the page memory.

Therefore, the transparency processing can be speeded up further due to the restriction of the transparency processing to the overlap rectangular area. Further, the memory conservation can be achieved more efficiently by the minimum reservation of the transparency processing buffer based on the size of the overlap rectangular area.

In at least one aspect, the printing device further comprises a band information storage unit which stores rectangular area information indicating the position and size of the overlap rectangular area and an overlap flag indicating whether or not the transparent rectangular area overlaps with the base rectangular area according to the judgment by the overlap judgment unit, in regard to each band. The transparency processing unit executes the transparency processing for each band whose overlap flag stored in the band information storage unit indicates that the transparent rectangular area overlaps with the base rectangular area, by executing the transparency processing just for the overlap rectangular area based on the rectangular area information, and stores the transparency-processed data obtained by the transparency processing in the transparency processing buffer which has been reserved by the transparency processing buffer reserving unit based on the size of the overlap rectangular area indicated by the rectangular area information.

With the printing device configured as above, the effects described above can be achieved with reliability by the management of the rectangular area information (indicating the position and size of the overlap rectangular area) and the overlap flag by use of the band information storage unit. Further, it is possible to prevent simultaneous execution of the transparency processing and the process judging whether the transparent rectangular area overlaps with the base rectangular area or not, slowing down of each process, and simultaneous use of resources by the processes.

In at least one aspect, the transparency processing buffer reserving unit reserves the transparency processing buffer just before the transparency processing is started for each band by the transparency processing unit and releases the transparency processing buffer just after the transparency processing is finished for each band by the transparency processing unit.

With the printing device configured as above, the transparency processing buffer is reserved and released in sync with the start and end of the transparency processing for each band, by which the length of the time with the transparency processing buffer reserved in memory (e.g. RAM) can be minimized and the possibility of shortage of memory for other processes can be reduced.

In at least one aspect, the printing device further comprises a transparency processing buffer initializing unit which initializes the transparency processing buffer by placing a value outside a range of values representing colors of objects throughout the transparency processing buffer.

With the printing device configured as above, the transparency processing buffer is initialized to the value outside the range of values representing colors. At the point when the transparency-processed data generated by the transparency processing has been written into the transparency processing buffer, parts of the transparency processing buffer still holding the value outside the range can clearly be recognized as parts where no object exists.

The image data generating unit generating the image data based on the transparency-processed data stored in the transparency processing buffer is allowed to leave out the process for the parts still holding the value outside the range (i.e. the parts with no object), by which useless processing can be eliminated and the process can be speeded up.

Incidentally, initializing the transparency processing buffer to "0" can result in incorrect transparency processing since it is impossible to judge whether the value "0" represents the initial value or the color of a white object. The initialization to a value outside the range has the advantage of avoiding the problem.

In at least one aspect, the image data generating unit executes the image data generating process while handling parts of the transparency processing buffer holding the value written by the transparency processing buffer initializing unit as parts where no object exists.

With the printing device configured as above, the image data generating unit generating the image data based on the transparency-processed data stored in the transparency processing buffer is allowed to leave out the process for the parts still holding the value outside the range (i.e. the parts with no object) as mentioned above, by which useless processing can be reduced and the process can be speeded up. Since the initialized values of the transparency processing buffer can be clearly discriminated from the values of the transparency-processed data, the image data generating unit is prevented from placing object images according to the transparency-processed data at improper coordinates (positions).

In at least one aspect, the printing device further comprises: an image data presence/absence judgment buffer which stores data presence/absence information indicating whether there exists an object that has been written into each part of the transparency processing buffer corresponding to each address of the page memory or not; and a data presence/absence information storage control unit which updates the data presence/absence information stored in the image data presence/absence judgment buffer each time an object is written into the transparency processing buffer. The transparency processing unit executes the transparency processing while omitting unnecessary steps of the transparency processing for parts of the transparency processing buffer into which no object has been written so far based on the data presence/absence information stored in the image data presence/absence judgment buffer. The image data generating unit executes the image data generating process while omitting the process for parts of the transparency processing buffer with no object based on the data presence/absence information stored in the image data presence/absence judgment buffer.

With the printing device configured as above, effects similar to those of the aforementioned initialization of the transparency processing buffer to a value outside the color range can be achieved by use of the image data presence/absence judgment buffer. Even though the image data presence/absence judgment buffer has to be reserved in the memory (e.g. RAM) of the printing device as an extra buffer, the increase in occupancy ratio of the memory can be minimized since one image data presence/absence judgment buffer can be shared among the four layers corresponding to CMYK.

According to another aspect of the invention, there is provided a computer readable medium having computer readable instruction stored thereon, which, when executed by a processor of printing device, configures the processor to perform: a print data receiving step of receiving print data, including multiple objects and accompanying information corresponding to at least one of the objects, inputted from outside; a transparent property judgment step of judging whether each of the objects is a transparent object having a transparent property or not by use of the accompanying information corresponding to the object; a transparency processing step of executing transparency processing of the objects and thereby generating transparency-processed data in a transparency processing buffer; an image data generating step of generating image data based on the transparency-processed data or the objects; an image data storage control step of storing the image data in a page memory; a printing step of printing an image on a print medium by use of a print engine and the image data stored in the page memory; and an object placement judgment step of regarding the page memory as a set of bands defined as prescribed areas and judging in which bands each of the objects is to be placed by use of the objects. In this configuration, the transparency processing step includes a step of judging whether to execute the transparency processing for a band based on whether the band is judged by the object placement judgment step to have at least a part of a transparent object.

Such a configuration of the printing device makes it possible to execute the transparence processing only for a band having at least a part of a transparent object. Therefore, the processing speed for generating image data can be increased.

In at least one aspect, the transparency processing step executes the transparency processing for each band satisfying a first condition that a transparent object recognized by the transparent property judgment step is judged by the object placement judgment step to be placed partially or totally in the band, by use of objects to be placed partially or totally in the band and thereby generates the transparency-processed data regarding the band. The transparency processing buffer stores the transparency-processed data regarding each band satisfying the first condition. In this case, the image data generating step generates the image data regarding each band satisfying the first condition based on the transparency-processed data regarding the band stored in the transparency processing buffer, while generating the image data regarding each band not satisfying the first condition by use of objects to be placed partially or totally in the band.

In at least one aspect, the instruction further configures the processor to perform an overlap judgment step of judging whether or not a transparent rectangular area, defined as the smallest rectangular area having two X sides parallel to one side of the image and two Y sides orthogonal to the X sides and surrounding all parts of transparent objects situated inside a band, overlaps with a base rectangular area defined as the smallest rectangular area having two X sides and two Y sides and surrounding all parts of nontransparent objects situated inside the band, in regard to each band by use of the accompanying information and the judgment by the object placement judgment step. In this case, the transparency processing step executes the transparency processing for each band satisfying a second condition that the transparent rectangular area in the band is judged by the overlap judgment step to overlap with the base rectangular area in the band, by use of objects to be placed partially or totally in the band and thereby generates the transparency-processed data regarding the band. The transparency processing buffer stores the transparency-processed data regarding each band satisfying the second condition. The image data generating step generates the image data regarding each band satisfying the second condition based on the transparency-processed data regarding the band stored in the transparency processing buffer, while generating the image data regarding each band not satisfying the second condition by use of objects to be placed partially or totally in the band.

EMBODIMENT

Referring now to the drawings, a description will be given in detail of preferred embodiments in accordance with the present invention.

First Embodiment

First, the configuration of a printer 10 as a printing device in accordance with a first embodiment of the present invention will be described.

FIG. 1 is a perspective view showing the printer 10 in accordance with the first embodiment. The printer 10 is configured as an MFP (Multi-Function Peripheral) or multifunction printer of a standard type, having not only the color printing function but also the copy function, scanner function and FAX function. Explanation of these functions is omitted here since they are irrelevant to the principal part of this embodiment.

The printer 10 is equipped with an operation panel 11 on its top surface. The operation panel 11 includes an input unit 12a, an operation unit 12b and an LCD (Liquid Crystal Display) panel display unit 13. The front surface of the printer 10 is provided with a USB port 14 and a slot unit 15.

Figure 2:
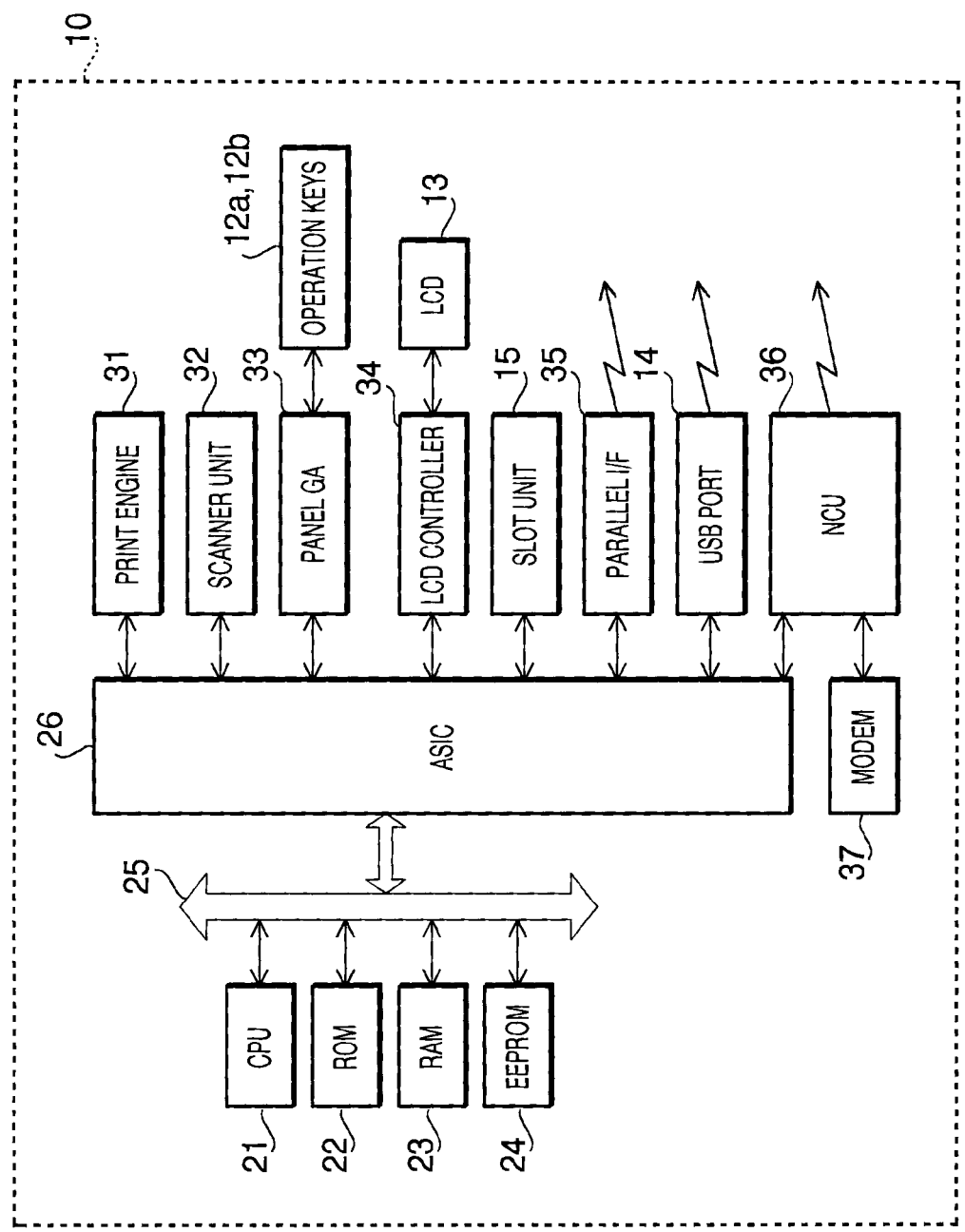
FIG. 2 is a block diagram showing the configuration of the printer of the first embodiment.
Figure 10:
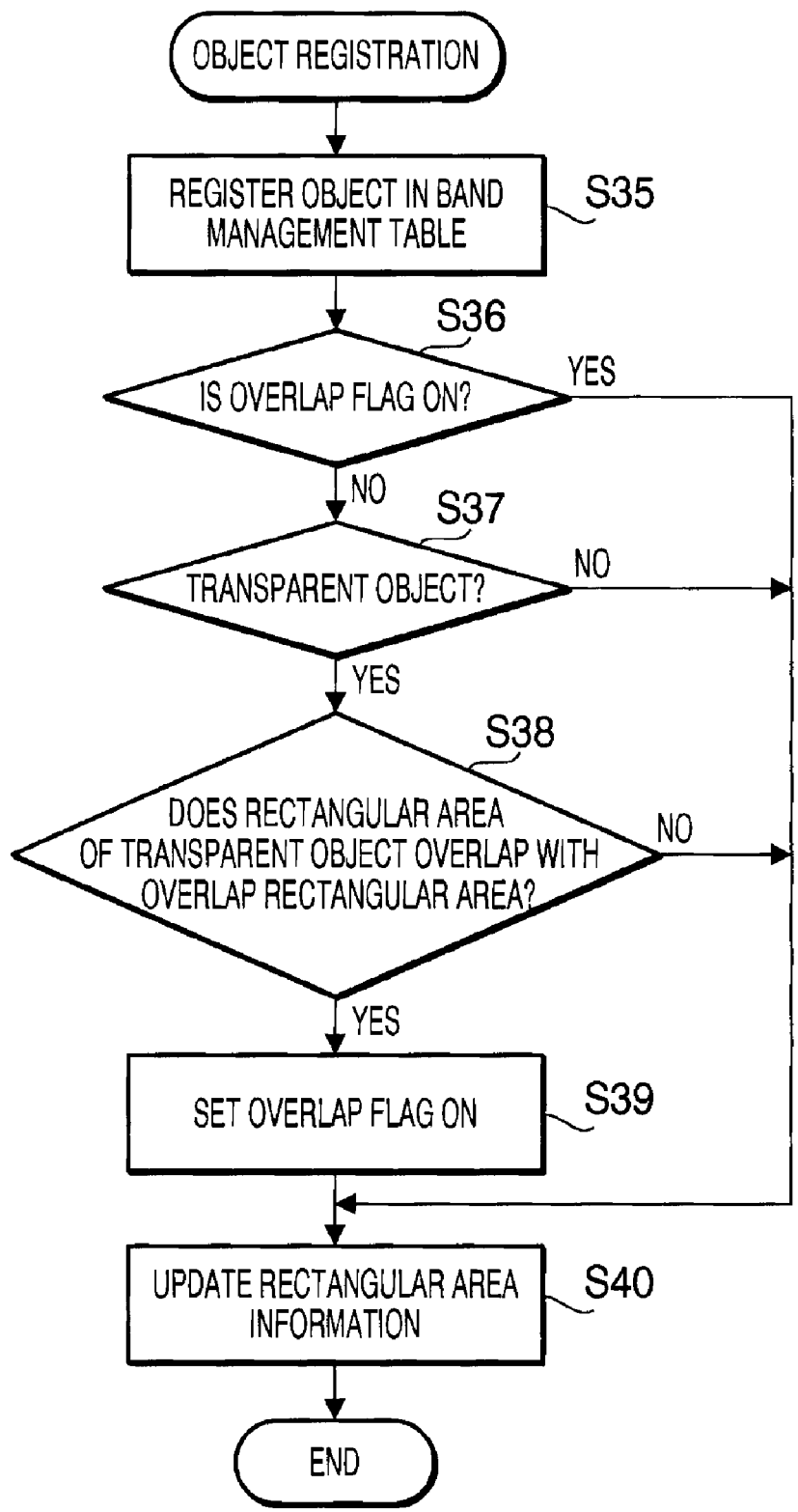
FIG. 10 is a flow chart of the "object registration" subroutine (S7 in FIG. 6) executed by the printer of the second embodiment.

FIG. 2 is a block diagram showing the configuration of the printer 10 of the first embodiment. As shown in FIG. 10, a CPU (Central Processing Unit) 21, a ROM (Read Only Memory) 22, a RAM (Random Access Memory) 23 and an EEPROM (Electrically Erasable Programmable ROM) 24 are connected to a bus 25 which is connected to an ASIC (Application-Specific Integrated Circuit) 26. The ASIC 26 is connected to a print engine 31, a scanner unit 32, a panel GA (Gate Array) 33, an LCD controller 34, the slot unit 15, a parallel I/F (interface) 35, the USB port 14, an NCU (Network Control Unit) 36, etc.

The input unit 12a and the operation unit 12b are connected to the panel GA 33. The LCD panel display unit 13 is connected to the LCD controller 34. Connected to the NCU 36 is a modem 37.

The user of the printer 10 of this embodiment performs a printing operation by operating the input unit 12a and the operation unit 12b of the operation panel 11 while viewing the LCD panel display unit 13, similarly to the printing operation on standard printers of the same type.

The printer 10 supports the so-called "direct print function". Specifically, a storage device like a USB memory (unshown) storing multiple pieces of data can be connected to or inserted into the USB port 14, or a storage device like a memory card (unshown) storing multiple pieces of data can be inserted into the slot unit 15. The data stored in such a storage device can directly be printed out without the need of using a computer (PC, etc.).

While a storage device (medium) of any type can be used for the direct print function as long as the storage device can be attached to and detached from the printer 10 (via the USB port 14, slot unit 15, etc.) during the operation of the printer 10 (after the activation of the printer 10), a USB memory is employed as the storage device in this embodiment just for the purpose of illustration.

The print engine 31, capable of color printing, is assumed to be equipped with a printer engine using a laser beam, for example. However, of course printer engines of other types can also be used properly since the printer engine is not directly relevant to the principal part of the present invention.

Incidentally, the "direct printing" includes not only the mode in which a storage device is directly connected to or inserted into the USB port 14 or the slot unit 15 but also a mode in which data sent from a network (LAN, etc.) connected to the parallel I/F 35 is received and directly printed out by the printer 10. In other words, the mode in which PDL (Page Description Language) data sent untouched from a computer is received and printed out by the printer 10 (not as in conventional techniques in which bitmap data which can be directly printed out is sent from a computer) is included in the category "direct printing".

Figure 3:
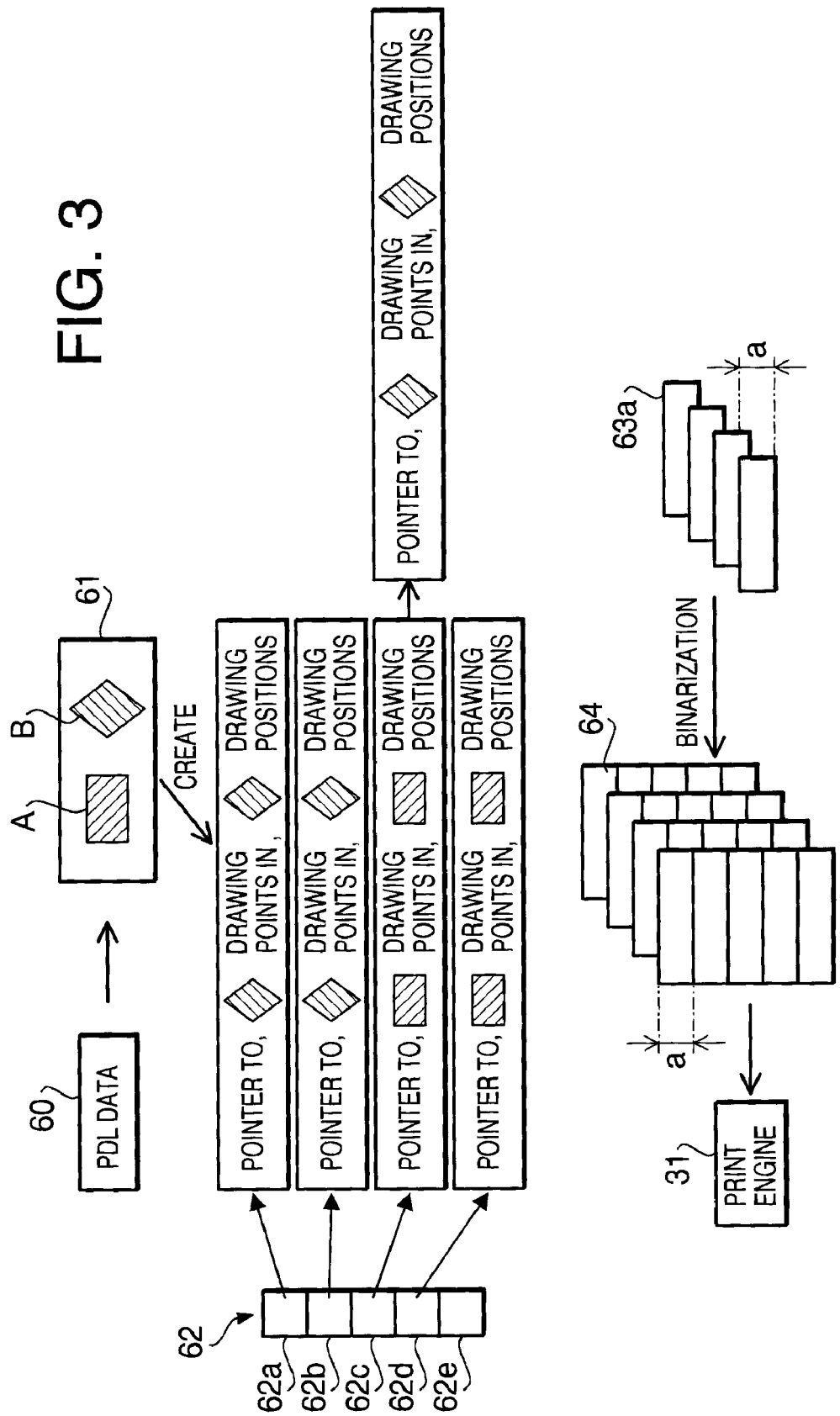
FIG. 3 is a conceptual schematic diagram for explaining the flow of "data processing by separating data into bands" which is employed basically in the first embodiment.

Next, the operations and effects of the printer 10 of the first embodiment will be described in detail below. First, a concept of "data processing by separating data into bands" will be explained. FIG. 3 is a conceptual schematic diagram showing the flow of the "data processing by separating data into bands" employed basically in this embodiment.

In FIG. 3, PDL data 60 is color data (data capable of representing color images) which is transferred to the printer 10 from a storage device connected to the USB port 14 or the slot unit 15, or from a network (LAN, etc.) connected to the parallel I/F 35.

For the simplicity of explanation, the PDL data 60 is assumed here to include a first object A and a second object B which is overlaid on the first object A. The second object B is a transparent object having the transparent property as its accompanying information.

When the PDL data 60 is transferred to the printer 10, the PDL data 60 is stored in an intermediate data storage area 61 (reserved in the RAM 23 of the printer 10) as the first object A and the second object B. At this stage, the data of the first and second objects A and B are stored in the intermediate data storage area 61 as data of deep bit depth. Specifically, the data of the first and second objects A and B are managed as 8-bit data in cases where the objects are expressed with 256-step gradation.

While the intermediate data storage area 61 is not necessarily essential for the data processing, the area 61 is reserved in the RAM 23 in this embodiment since it is advantageous for the generation of the intermediate data.

Subsequently, an area for storing a band management table 62 (for managing band information) is reserved in the RAM 23. The band management table 62 is used for managing information about management pointers of the first and second objects A and B, drawing points and drawing positions regarding objects to be drawn in (i.e. drawn partially or totally in, ditto for the expression "drawn in" in the following explanation) a band, etc. in regard to each band (having a band width "a") which is obtained by dividing a page memory area 64 (in which data to be finally printed out is developed) into multiple bands.

Subsequently, an area for a transparency processing buffer 63a is reserved in the RAM 23 according to the band size, and the data of the first and second objects A and B stored in the intermediate data storage area 61 is processed in units of bands according to the band management table 62.

Since the PDL data 60 includes the first object A and the second object B which has the transparent property, the transparency processing is necessary. In the overlapping part of the first and second objects A and B, different colors have to be stacked up (mixed) since the second object B is a transparent object. Therefore, the data of the first and second objects A and B are processed in each of the four layers corresponding to the four colors CMYK (Cyan, Magenta, Yellow, black), as 256-step (gradation) data of the stacked objects A and B (with the second object B overlaid on the first object A).

The processed data in the transparency processing buffer 63a is developed into the page memory area 64 by binarizing it into data of shallow bit depth. At the completion of the development of the data of the first and second objects A and B (originally stored in the intermediate data storage area 61) into the page memory area 64, image data in a printable state has been formed in the page memory area 64, and thus the image data is transferred to the print engine 31 to be printed out.

By executing the transparency processing in units of bands as above, the occupancy ratio of the transparency processing buffer 63a in the RAM 23 can be made smaller compared to the transparency processing in units of pages which has been explained above.

The effects of the above transparency processing shown in FIG. 3 will be briefly explained below. Such transparency processing in units of bands, realizing low occupancy ratio of the RAM 23, is effective for memory-conserving operation of the printer 10. Since the RAM 23 is an expensive component, the manufacturing cost of the printer 10 can be reduced considerably only by reducing the capacity of the RAM 23 (i.e. by employing a RAM 23 of small capacity). As mentioned above, 256-step data (data of deep bit depth) needs a larger memory capacity compared to binary (2-step) data (data of shallow bit depth). Meanwhile, the transparency processing requires data of deep bit depth, that is, the transparency processing has to be executed using 256-step data, for example. While binary data needs only 1 bit per pixel, 256-step data needs 8 bits per pixel (eight times the memory capacity for binary data). Therefore, as the transparency processing buffer 63a gets smaller, the capacity of the memory (e.g. RAM 23) necessary for the processing can be reduced accordingly.

Figure 4:
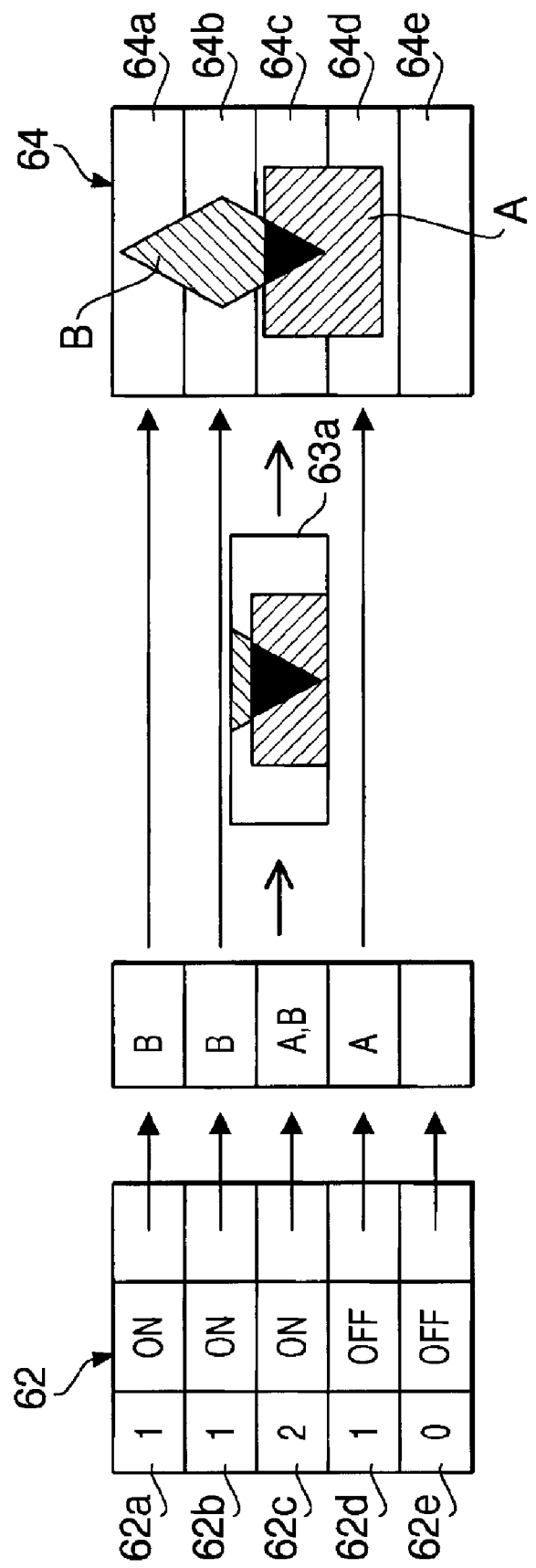
FIG. 4 is a schematic diagram showing an example of the relationship between a band management table and a page memory area employed in the first embodiment.

Next, the contents of the band management table 62 storing the band information in the first embodiment will be explained. FIG. 4 is a schematic diagram showing an example of the relationship between the band management table 62 and the page memory area 64. In the example of FIG. 4, the page memory area 64 is divided into five areas. Corresponding to the division number (=5), five management areas are formed in the band management table 62. In each management area, information on objects to be processed in each band is stored. Incidentally, the division number of the page memory area 64 is not restricted to five but can vary depending on the design of the printer 10, etc.

The band management table 62 manages (stores) information on the number of objects to be processed, the presence/absence of a transparent object, the management pointers of the objects, the drawing points and the drawing positions regarding objects to be drawn in each band, etc. The band management table 62, having five management areas, is assumed here to include a first line 62a, a second line 62b, a third line 62c, a fourth line 62d and a fifth line 62e (each "line" means a management area). Meanwhile, the page memory area 64 (corresponding to the band management table 62) is also divided into a first band 64a, a second band 64b, a third band 64c, a fourth band 64d and a fifth band 64e.

In this case, in the first line 62a of the band management table 62, the number of objects is recorded as "1" since only the second object B is to be drawn in the first band 64a of the page memory area 64. Since the object to be drawn in the first band 64a is the second object B, information on the second object B is recorded in the first line 62a. The transparent object presence/absence information is recorded as "ON" since the second object B has the transparent property.

Similarly, in the second line 62b of the band management table 62, the number of objects is recorded as "1", information on the second object B to be drawn in the second band 64b is recorded, and the transparent object presence/absence information is recorded as "ON".

In the third line 62c of the band management table 62, the number of objects is recorded as "2" (since both the first and second objects A and B are to be drawn in the third band 64c of the page memory area 64), and information on the first and second objects A and B to be drawn in the third band 64c is recorded. The transparent object presence/absence information is recorded as "ON" since the second object B has the transparent property.

In the fourth line 62d of the band management table 62, the number of objects is recorded as "1" since only the first object A is to be drawn in the fourth band 64d of the page memory area 64. Since the object to be drawn in the fourth band 64d is the first object A, information on the first object A is recorded in the fourth line 62d. The transparent object presence/absence information is recorded as "OFF" since the first object A does not have the transparent property.

Finally, in the fifth line 62e of the band management table 62, the number of objects is recorded as "0" since no object is to be included (drawn) partially or totally in the fifth band 64e of the page memory area 64. Since no object is to be drawn in the fifth band 64e, information on no object is recorded and the transparent object presence/absence information is recorded as "OFF" in the fifth line 62e.

In the above correspondence relationship between the band management table 62 and the page memory area 64 shown in FIG. 4, it is obvious that bands that should be handled as the targets of the transparency processing are those whose number of objects is two or more and whose transparent object presence/absence information is "ON" in the band management table 62. In the example of FIG. 4, the third band 64c is the only band actually needing the transparency processing.

Therefore, the data in the first band 64a (not needing the transparency processing) can be obtained by directly developing the 256-step data stored in the intermediate data storage area 61 into binary data by use of the information managed in the first line 62a of the band management table 62. The data in the second band 64b and the fourth band 64d (not needing the transparency processing) can also be obtained similarly by use of the information managed in the second line 62b and the fourth line 62d, respectively. Meanwhile, no development is necessary for the fifth band 64e including no drawing object. Since the data in the first band 64a, the second band 64b, the fourth band 64d and the fifth band 64e in the page memory area 64 are obtained as above, all the data necessary in the whole page memory area 64 can be obtained by further executing the transparency processing (using the transparency processing buffer 63a) for the third band 64c only.

While the same process using the transparency processing buffer 63a is executed equally for the first line 62a, the second line 62b, the third line 62c and the fourth line 62d of the band management table 62 in the process flow shown in FIG. 3, high-speed processing becomes possible by modifying the process flow depending on the conditions (information) in the band management table 62 as above.

Figure 5:
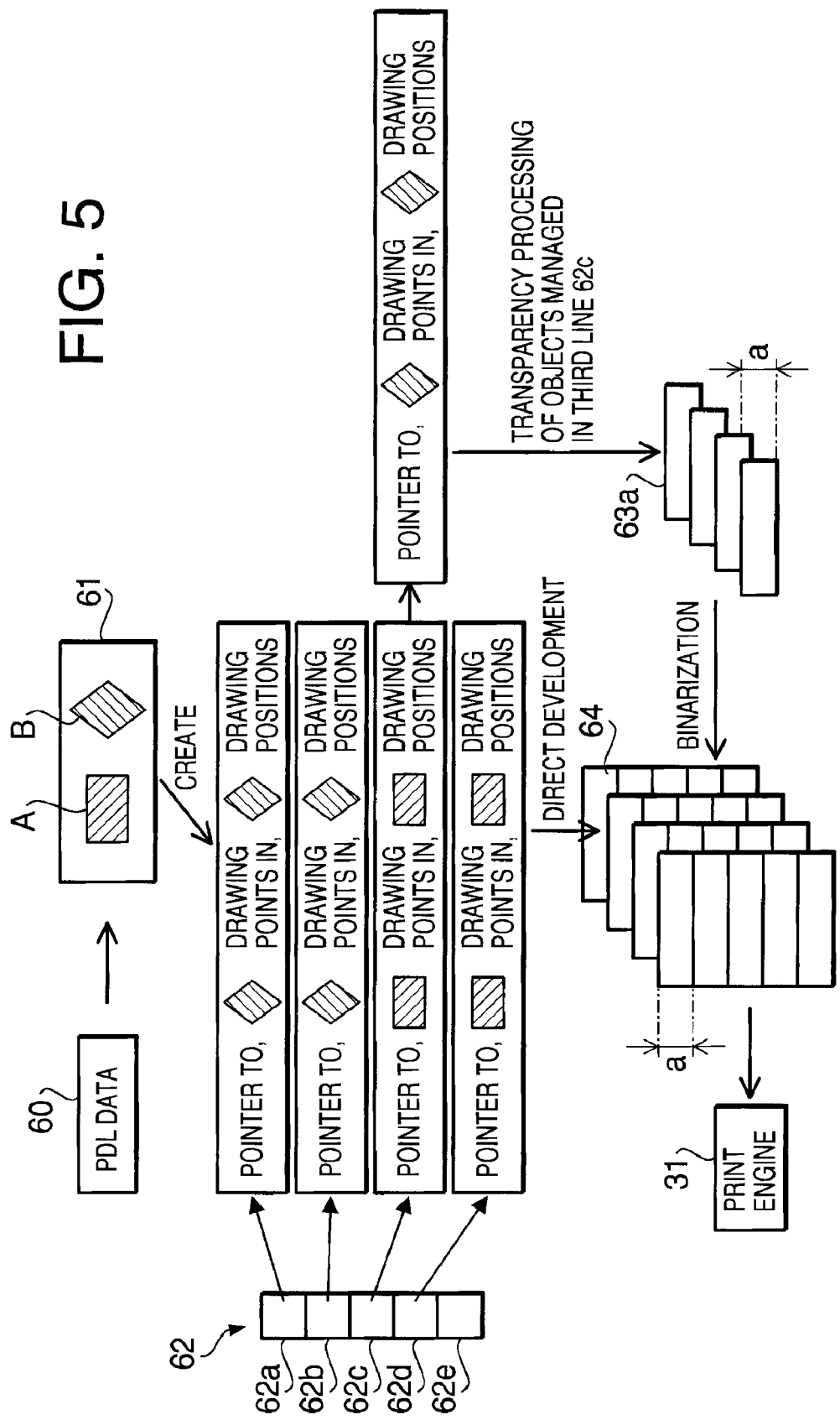
FIG. 5 is a schematic diagram specifically showing the flow of data processing employed in the first embodiment.
Figure 6:
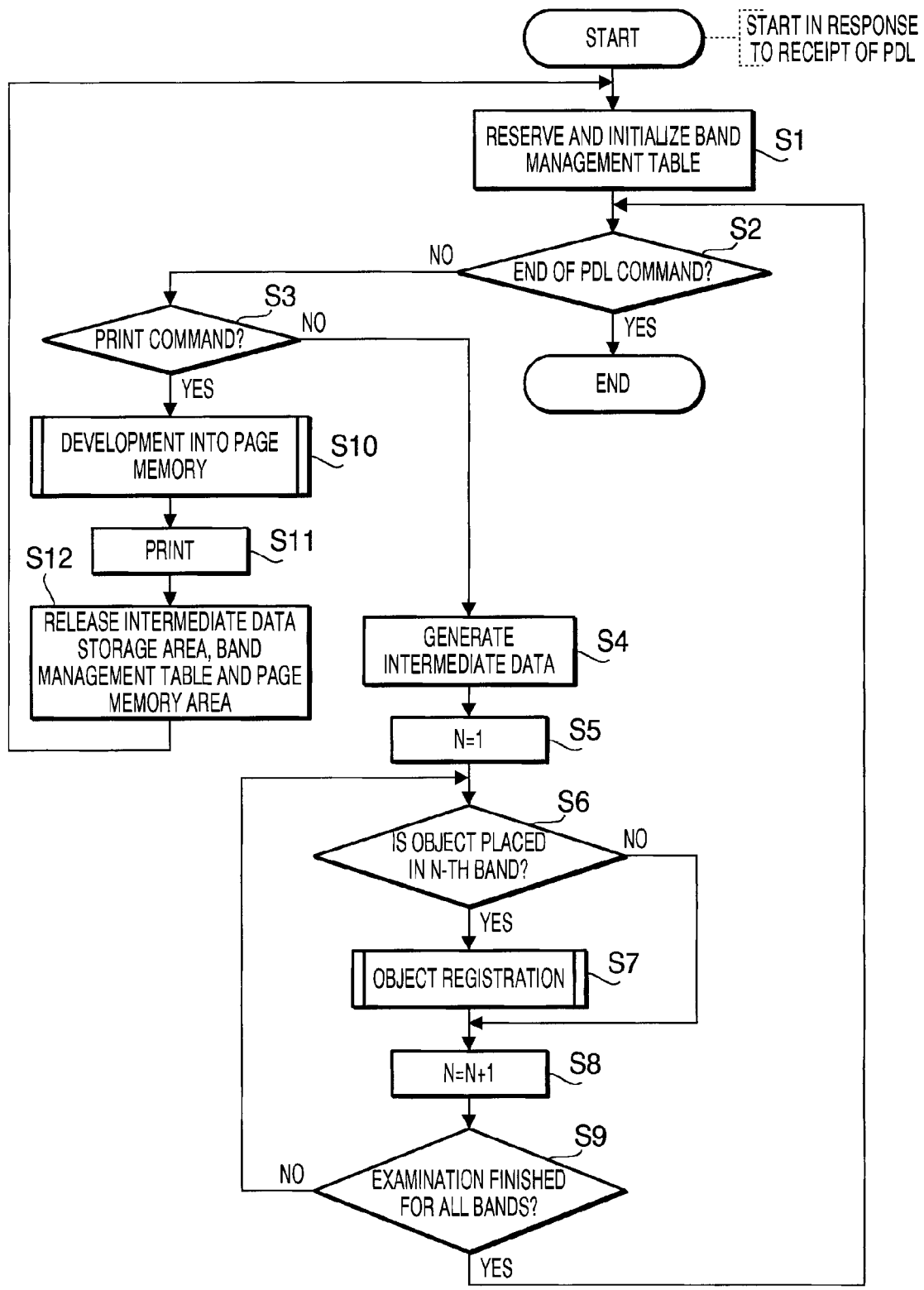
FIG. 6 is a flow chart showing a process (details of the data processing) executed by the printer of the first embodiment.

FIG. 5 is a schematic diagram specifically showing the flow of data processing employed in the first embodiment, in which the contents of FIG. 4 are incorporated into the basic concept "data processing by separating data into bands" which has been shown in FIG. 3. FIG. 6 is a flow chart showing a process (details of the data processing) executed by the printer 10 of the first embodiment.

The process of FIG. 6 is started when PDL data is received by the printer 10. At the start of the process, the printer 10 (CPU 21) reserves the band management table 62 (for each page) in the RAM 23 and initializes the band management table 62 (S1). Subsequently, the printer 10 checks whether the PDL command has ended or not (S2). If the PDL command has ended (S2: YES), the printer 10 ends the routine (process of FIG. 6).

If the PDL command has not ended (S2: NO), the printer 10 checks whether a print command has been issued or not (S3). If no print command has been issued (S3: NO), the printer 10 starts generating the intermediate data (S4). If a print command has been issued (S3: YES), the printer 10 advances to step S10.

In the step S4, the printer 10 generates the intermediate data in the intermediate data storage area 61 previously reserved in the RAM 23. Since the PDL data 60 includes data of the first and second objects A and B as shown in FIG. 5 (as explained above), various intermediate data having information on the 256-step gradation are formed in regard to the first and second objects A and B. Since the process is executed in units of objects, the printer 10 first generates the intermediate data of the first object A and advances to step S5.

In the step S5, the printer 10 initializes a band counter N to 1 so that the first band can be processed. In the next step S6, the printer 10 examines whether the currently-processed object (the source of the intermediate data) is to be placed in (i.e. placed partially or totally in, ditto for the expression "placed in" in the following explanation) the N-th band (N: band counter value) or not based on the object (i.e., information on the drawing position of the object). In the first execution of the step S6 (N=1, object=A), the printer 10 judges that the first object A is not to be placed in the first band 64a (S6: NO) and thereby advances to step S8. Meanwhile, in the third execution of the step S6 (N=3, object=A), for example, the printer 10 judges that the first object A is to be placed in the third band 64c (S6: YES) and thereby advances to step S7.

In the step S7, the printer 10 executes an "object registration" subroutine which will be explained in detail later. After finishing the step S7, the printer 10 advances to the step S8.

In the step S8, the printer 10 increments the band counter N by 1. In the next step S9, the printer 10 checks whether the examination of S6 has been finished for all the bands 64a-64e or not by referring to the value of the band counter N. When the examination of S6 has not been finished for all the bands 64a-64e (S9: NO), the printer 10 returns to the step S6 to execute the examination again for the next band. On the other hand, when the examination of S6 has been finished for all the bands 64a-64e (S9: YES), the printer 10 returns to the step S2 to execute the process from S2 again for the next object.

When the object registration has been finished for all the objects included in the PDL data 60 (i.e. first and second objects A and B) by the repetition of the loop of S6-S9, the print command is issued (S3: YES). In this case (S3: YES), the printer 10 advances to the step S10.

In the step S10, the printer 10 executes a "development into page memory" subroutine which will be explained in detail later. After finishing the step S10, the printer 10 advances to step S11. In the step S11, the image data which has been developed in the page memory area 64 is handed over to the print engine 31 and the printing is executed. In the next step S12, the printer 10 releases the intermediate data storage area 61, the band management table 62 and the page memory area 64 (releases areas which have occupied part of the RAM 23 and clears information). Thereafter, the process returns to the step S1.

At the completion of the whole printing process, the PDL command ends (S2: YES) and the routine (process of FIG. 6) is ended. As above, the process (data processing) schematically shown in FIG. 5 is executed according to the flow chart of FIG. 6.

In the following, the aforementioned subroutines will be explained in detail.

Figure 7:
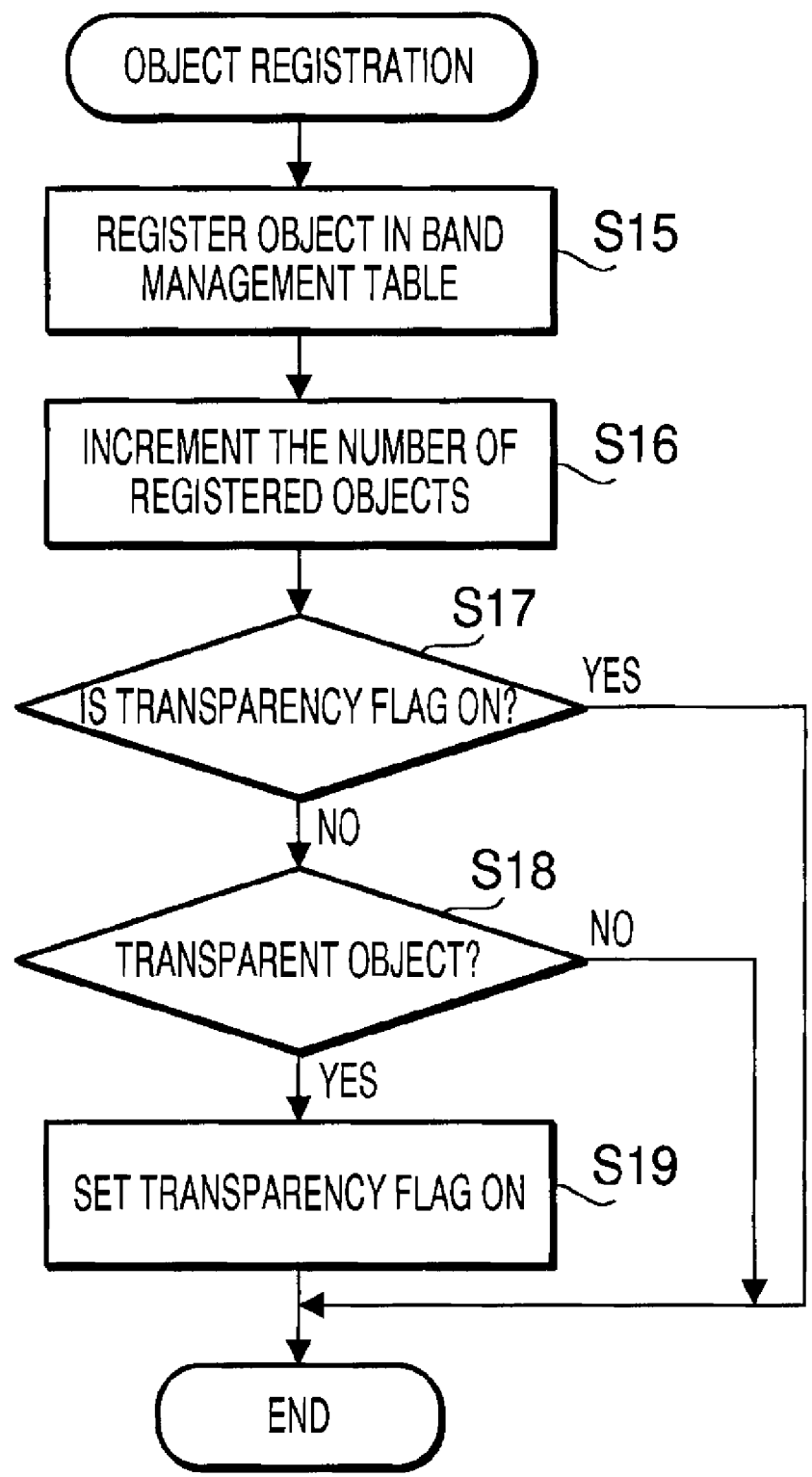
FIG. 7 is a flow chart of an "object registration" subroutine (S7 in FIG. 6) executed by the printer of the first embodiment.

First, the "object registration" subroutine which is executed in the step S7 in FIG. 6 will be described in detail. FIG. 7 is a flow chart of the "object registration" subroutine (S7 in FIG. 6). In the subroutine of FIG. 7, the (currently processed) object is examined in regard to each band (N-th band corresponding to the band counter N) and information on the object is recorded in a corresponding area (N-th line) of the band management table 62 for the management of the band.

In step S15, the printer 10 registers the (currently processed) object in the band management table 62. An example of status of the registration is shown in FIG. 4. For example, when the "object registration" subroutine is executed for the first object A and the band counter N set by the steps S5 and S8 in FIG. 6 is 3, a pointer to the intermediate data of the first object A, the drawing points in the intermediate data, and the drawing positions in the page memory are registered in the third line 62c of the band management table 62.

In the next step S16, the printer 10 increments the number of objects already registered in the band management table 62. The number of objects (initial value=0) is incremented by 1 on each execution of the step S16. Since the examination on whether the object is to be placed (drawn) in the N-th band (i.e. whether the object overlaps with the N-th band) or not has already been executed in the step S6 in FIG. 6, this subroutine is not executed when the object is not to be placed in the N-th band (S6: NO). Therefore, the currently processed object is necessarily placed (drawn) in the N-th band when the "object registration" subroutine (for the N-th band) is executed.

In the next step S17, the printer 10 checks whether or not a "transparency flag" has been set ON. In this step, the printer 10 refers to the transparency flag stored in the N-th line of the band management table 62. Specifically, when the band counter N is 3, the printer 10 checks whether the transparency flag (representing the transparent object presence/absence information) in the third line 62c has been set ON. At the first execution of the step S17, the transparency flag has been initialized to "OFF" (S17: NO), and thus the printer 10 advances to step S18. On the other hand, when the transparency flag is ON (S17: YES), the "object registration" subroutine of FIG. 7 is ended.

In the step S18, the printer 10 checks whether the object is a transparent object or not. For example, when the currently processed object is the first object A not having the transparent property, the judgment of S18 results in "NO" (S18: NO), by which the subroutine of FIG. 7 is ended. When the currently processed object is the second object B having the transparent property, the judgment of S18 results in "YES" (S18: YES), and the printer 10 advances to step S19.

In the step S19, the printer 10 sets the transparency flag ON. Thereafter, the "object registration" subroutine of FIG. 7 is ended. The object registration is executed as above.

Figure 8:
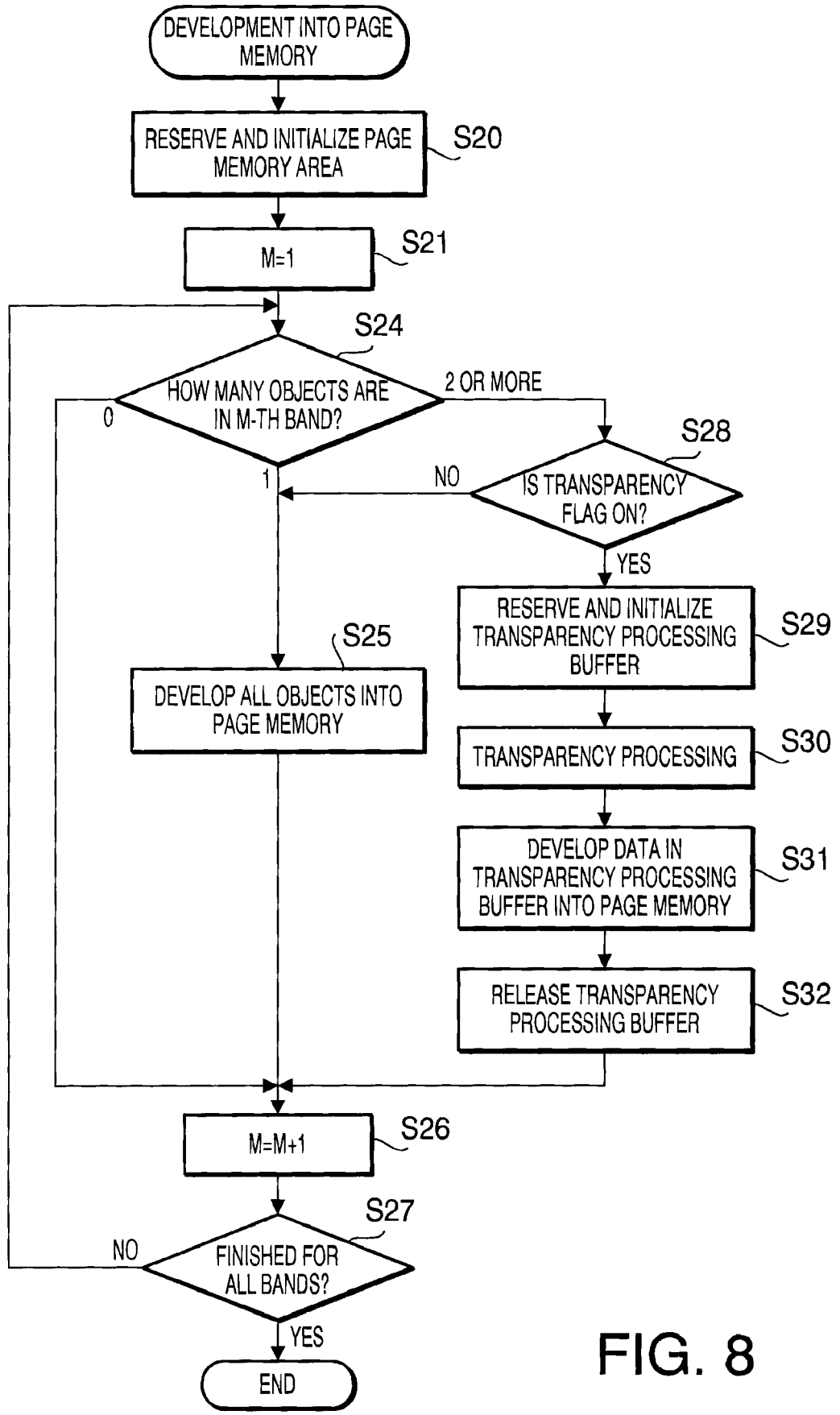
FIG. 8 is a flow chart of a "development into page memory" subroutine (S10 in FIG. 6) executed by the printer of the first embodiment.

Next, the "development into page memory" subroutine which is executed in the step S10 in FIG. 6 will be described in detail. FIG. 8 is a flow chart of the "development into page memory" subroutine (S10 in FIG. 6). In the subroutine of FIG. 8, the intermediate data of the PDL data 60 stored in the intermediate data storage area 61 are processed properly based on the information registered in the band management table 62. Specifically, when the transparency processing is necessary for intermediate data for a band, the transparency processing is executed to the intermediate data by use of the transparency processing buffer 63a. When the transparency processing is unnecessary for intermediate data for a band, the intermediate data is directly binarized and developed into the page memory area 64.

In step S20, the printer 10 reserves an area for the page memory area 64 in the RAM 23 and initializes the page memory area 64. In the next step S21, the printer 10 initializes a band counter M to 1.

In the next step S24, the printer 10 checks the number of objects regarding the M-th band (M: band counter value) that has been registered in the band management table 62. For example, when the band counter M is 1, the printer 10 checks the number of objects already registered in the first line 62a of the band management table 62. The printer 10 advances to step S26 when the number of objects is 0 (S24: 0), to step S25 when the number of objects is 1 (S24: 1), or to step S28 when the number of objects is 2 or more (S24: 2 OR MORE).

In the step S25, the printer 10 develops all objects registered in the M-th line (M: band counter value) of the band management table 62 directly into the page memory area 64. For example, when the band counter M is 1, the printer 10 refers to the first line 62a of the band management table 62, recognizes that only the second object B has been registered in the first line 62a, develops a part (area) of the second object B to be placed (drawn) in the first band 64a into the first band 64a of the page memory area 64. In this case, even though the second object B has the transparent property, the combining process (transparency processing) becomes unnecessary for the part (area) of the second object B (since the number of objects registered in the first line 62a is 1), and thus the printer 10 develops the part of the second object B directly into the page memory area 64 without using the transparency processing buffer 63a.

Meanwhile, when the band counter M is 4, the printer 10 refers to the fourth line 62d of the band management table 62, recognizes that only the first object A has been registered in the fourth line 62d, develops a part (area) of the first object A to be placed in the fourth band 64d into the fourth band 64d of the page memory area 64. After finishing the step S25, the printer 10 advances to the step S26. In the step S26, the printer 10 increments the band counter M by 1.

In the next step S27, the printer 10 checks whether the band process (the loop of S24-S26) has been finished for all the bands 64a-64e. Specifically, the printer 10 compares the band counter M with the total number of bands and judges that the band process has been finished for all the bands (S27: YES) when the band counter M has exceeded the total number of bands. In this case (S27: YES), the "development into page memory" subroutine of FIG. 8 is ended. When the band counter M has not exceeded the total number of bands, the printer 10 judges that the band process has not been finished for all the bands (S27: NO) and returns to the step S24.

In the aforementioned judgment of S24, the printer 10 referring to the band management table 62 advances to the step S28 when the number of objects regarding the M-th band is 2 or more. In the case of the PDL data 60 shown in FIG. 5, the printer 10 in S24 advances to the step S28 when the band counter M is 3 since the number of objects registered in the third line 62c of the band management table 62 is "2" as shown in FIG. 4.

In the step S28, the printer 10 refers to the band management table 62 and checks whether or not the transparency flag has been set ON. When the transparency flag is not ON (S28: NO), the printer 10 advances to the step S25. When the transparency flag is ON (S28: YES), the printer 10 advances to step S29. In the example of FIG. 4, the judgment step S28 via S24 (S24: 2 OR MORE) occurs only when the printer 10 refers to the third line 62c of the band management table 62 (i.e. when the band counter M is 3). In this case, the printer 10 advances to the step S29 since the transparency flag in the third line 62c is ON (S28: YES).

In the step S29, the printer 10 reserves an area for the transparency processing buffer 63a in the RAM 23 and initializes the transparency processing buffer 63a.

In the next step S30, the printer 10 executes the transparency processing for the objects managed in the M-th line of the band management table 62. In the case where the band counter M is 3 (with the second object B having the transparent property), the printer 10 in S30 executes the transparency processing since the overlapping part where the second object B is stacked on the first object A (i.e. where the colors of the first and second objects A and B are mixed together) has to be drawn in the third band 64c.

In the next step S31, the printer 10 develops the data obtained in the transparency processing buffer 63a by the transparency processing into the page memory area 64. In this embodiment, the obtained data (transparency-processed data) is developed into the third band 64c of the page memory area 64. In the next step S32, the printer 10 releases the transparency processing buffer 63a which has occupied part of the RAM 23.

The first embodiment described above has the following advantages. The printer 10 of the first embodiment configured as above divides the page memory area 64 into multiple bands and executes the transparency processing in units of bands, by which the size of the area in the RAM 23 occupied by the transparency processing buffer is reduced compared to conventional printers.

Each part requiring the transparency processing is managed by the band management table 62 in terms of the number of objects and the transparency flag. Specifically, the transparency processing is executed for a band when the number of objects is 2 or more and the transparency flag is ON. In other cases, the intermediate data is directly binarized and developed into the page memory area 64.

Therefore, in the case of the PDL data 60 in the first embodiment (see FIGS. 4 and 5), most of the intermediate data stored in the intermediate data storage area 61 are directly binarized and developed into the page memory area 64 (except for the third band 64c of the page memory area 64) while executing the transparency processing for the third band 64c only. By the omission of unnecessary transparency processing, processing speed is increased considerably.

In reality, a printer 10 is generally equipped with a CPU 21 having lower processing power compared to those in personal computers in consideration of manufacturing costs. It is also difficult to equip a printer 10 with a high-capacity RAM 23 from the viewpoint of costs, etc. With the restrictions on the CPU 21 and RAM 23, the printing process including the transparency processing of PDL data 60 takes a long processing time.

Under such circumstances, the printer 10 in accordance with the first embodiment, capable of memory conservation and high-speed processing, is expected to reduce the printing time of PDL data 60.

While the processing speed and storage capacity of the CPU 21 and RAM 23 installed in a printer 10 are expected to increase gradually in years to come, the printer 10 of the first embodiment, reducing the processing time and the load on the memory and realizing high-speed processing of PDL data (like the PDL data 60 having the transparent property), has a great advantage of being capable of printing a larger number of files per unit time.

Second Embodiment

In the following, a printer 10 as a printing device in accordance with a second embodiment of the present invention will be described. The basic configuration of the printer 10 of the second embodiment is identical with that in the first embodiment (see FIGS. 1 and 2), and thus repeated explanation thereof is omitted here.

In the first embodiment described above, the memory conservation is realized by employing the transparency processing buffer 63a for the processing in units of bands, and the printing process is speeded up by making the judgments of S24 and S28 in FIG. 8 (on the necessity for the transparency processing) in units of bands and omitting the transparency processing for bands not needing the transparency processing.

However, even the printer 10 of the first embodiment (making the judgment on whether the second object B having the transparent property exists in a band or not) does not judge whether the second object B having the transparent property actually overlaps with the first object A or not. Thus, the printer 10 of the first embodiment might uselessly execute the transparency processing even when there is actually no overlapping part between the first and second objects A and B. The second embodiment described below was designed for resolving this problem.

Figure 9:
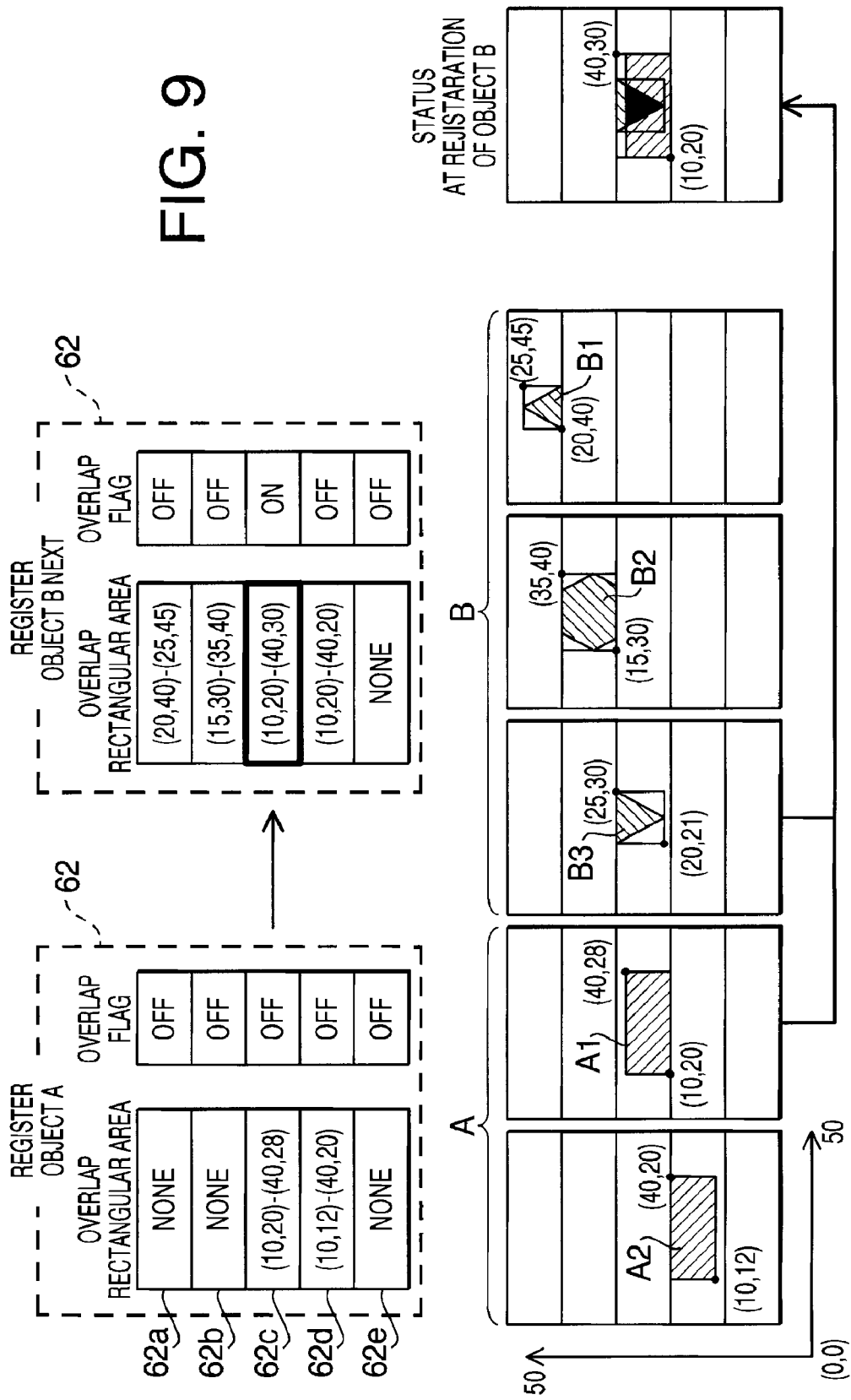
FIG. 9 is a conceptual diagram for explaining the object registration which is executed by a printer as a printing device in accordance with a second embodiment.

FIG. 9 is a conceptual diagram for explaining the object registration which is executed by the printer 10 of the second embodiment. A band management table 62 employed in the second embodiment stores information about an overlap rectangular area and an overlap flag in regard to each band, and thus the number of objects and the transparent object presence/absence information registered in the band management table 62 in the first embodiment are not used in the second embodiment. The band management table 62 in the second embodiment also stores the aforementioned information necessary for the drawing of the objects (information on the management pointers of the objects, the drawing points and the drawing positions regarding objects to be drawn in each band, etc.) similarly to the table in the first embodiment.

Referring to the lower part of FIG. 9, a rectangular area corresponding to the page memory area 64 is defined as an area in which the first and second objects A and B are actually drawn (also referred to as "the page memory area 64" for convenience, ditto for the first through fifth bands 64a-64e in the page memory area 64). The two-dimensional coordinates of the four corners (lower left corner, upper left corner, lower right corner, upper right corner) of the page memory area 64 are defined as (0, 0), (50, 0), (0, 50) and (50, 50), respectively, and the width of each band in the vertical direction (band height "a") is assumed to be 10 (a=10). In this case, since the first object A is to be drawn in a (10, 20)-(40, 28) area (rectangular area specified by the diagonal line) in the third band 64c and in a (10, 12)-(40, 20) area in the fourth band 64d, the two areas are regarded as base rectangular areas and are registered as the aforementioned "overlap rectangular areas".

Incidentally, the base rectangular area in each band is defined as the smallest rectangular area having two X sides (parallel to a side of the band) and two Y sides (orthogonal to the X sides) and surrounding all parts of nontransparent objects situated inside the band. A transparent rectangular area in each band is defined as the smallest rectangular area having two X sides and two Y sides and surrounding all parts of transparent objects situated inside the band. The overlap rectangular area in each band is defined as the smallest rectangular area surrounding the parts (areas) of all the objects registered in the band (i.e. registered in the line corresponding to the band), that is, the smallest rectangular area surrounding all parts of objects (nontransparent objects and transparent objects) situated inside the band.

Specifically, for the third band 64c managed in the third line 62c of the band management table 62, the first object A is first registered therein (i.e. registered in the third line 62c) and the first object A does not have the transparent property. Therefore, at the point when the first object A is registered in the third line 62c, the part of the first object A situated inside the third band 64c (the aforementioned (10, 20)-(40, 28) area) is regarded as the base rectangular area in the third band 64c, and is immediately registered as the overlap rectangular area in the third band 64c. Similarly, at the point when the first object A is registered in the fourth line 62d, the part of the first object A situated inside the fourth band 64d (the aforementioned (10, 12)-(40, 20) area) is regarded as the base rectangular area in the fourth band 64d, and is immediately registered as the overlap rectangular area in the fourth band 64d.

Meanwhile, the second object B having the transparent property is to be drawn in a (20, 40)-(25, 45) area in the first band 64a, in a (15, 30)-(35, 40) area in the second band 64b, and in a (20, 21)-(25, 30) area in the third band 64c. In this case, even though the second object B is in a diamond shape, the smallest rectangular area surrounding each part (area) of the second object B (divided into bands) situated inside each band is regarded as an object drawing area in each band for the simplification of the process, and each of such rectangular areas (object drawing areas) is regarded as the transparent rectangular area in each band since the second object B has the transparent property.

Subsequently, whether the transparent rectangular area (in each band) overlaps with the overlap rectangular area (in the band) already registered in (the corresponding line of) the band management table 62 or not is examined. Since the first and second objects A and B overlap with each other only in the third band 64c (i.e. in the area managed in the third line 62c of the band management table 62), the overlap flag in the third line 62c is set "ON". Meanwhile, the overlap flags in the other lines 62a, 62b, 62d and 62e remain "OFF" since the other bands (areas) 64a, 64b, 64d and 64e include no overlapping part.

The overlap rectangular areas are updated each time an object is registered in the band management table 62.

The overlap flag in a line of the band management table 62 is set "ON" when a newly registered object is a transparent object having the transparent property and the smallest rectangular area surrounding the part of the newly registered object (divided into bands) situated inside the band overlaps with the already-registered overlap rectangular area in the band. The overlap flag in each line of the band management table 62 is not updated when the newly registered object does not have the transparent property or when the smallest rectangular area surrounding the part of the newly registered transparent object (divided into bands) situated inside the band does not overlap with the already-registered overlap rectangular area in the band.

In order to implement the above process, the printer 10 in the second embodiment executes the "object registration" subroutine and the "development into page memory" subroutine differently from those in the first embodiment. The basic flow of the data processing in the second embodiment is identical with that in the first embodiment shown in FIG. 6 even though the subroutines differ from those in the first embodiment. Therefore, the subroutines will be described in detail below while omitting repeated explanation of the basic flow. Incidentally, while the basic flow is identical with that shown in FIG. 6, the contents of the initialization step S1 differ from those in the first embodiment since the elements of the band management table 62 are different from those in the first embodiment.

First, the "object registration" subroutine which is executed in the step S7 in FIG. 6 will be described in detail. FIG. 10 is a flow chart of the "object registration" subroutine in the second embodiment. In the subroutine of FIG. 10, the (currently processed) object is examined in regard to each band (N-th band corresponding to the band counter N) and information on the object is recorded in a corresponding area (N-th line) of the band management table 62. The flow of the subroutine of FIG. 10 differs from that in the first embodiment (FIG. 7) since the information registered in the band management table 62 differs from that in the first embodiment.

In step S35, the printer 10 registers the (currently processed) object in the band management table 62. An example of status of the registration is shown in FIG. 9. For example, when the "object registration" subroutine is executed for the first object A and the band counter N set by the steps S5 and S8 in FIG. 6 is 3, the part of the first object A to be drawn in the third band 64c is registered in the third line 62c of the band management table 62.

In the next step S36, the printer 10 checks whether the overlap flag in the N-th line of the band management table 62 (N: band counter value) is ON or not. For example, when the examined (currently processed) object is the first object A, the overlap flag is OFF (S36: NO) since the information recorded in the N-th line of the band management table 62 remains in the initial state. In this case, the printer 10 advances to step S37. On the other hand, when the overlap flag in the N-th line of the band management table 62 is ON (S36: YES), the printer 10 advances to step S40.

In the step S37, the printer 10 examines whether the currently processed object is a transparent object having the transparent property. For example, when the currently processed object is the first object A, the printer 10 judges that the object does not have the transparent property (S37: NO) and thereby advances to the step S40. When the currently processed object is the second object B, the printer 10 judges that the object has the transparent property (S37: YES) and thereby advances to step S38.

In the step S38, the printer 10 checks whether the smallest rectangular area surrounding the part of the transparent object (divided into bands) situated inside the N-th band overlaps with the overlap rectangular area registered in the N-th line of the band management table 62. For example, when the band counter N is 3 in the examination of the second object B, the printer 10 judges that the smallest rectangular area surrounding the part of the second object B (transparent object) situated inside the third band 64*c* overlaps with the overlap rectangular area already registered in the third line 62*c* (S38: YES). In this case (S38: YES), the printer 10 advances to step S39. Meanwhile, when the band counter N is not 3 (i.e. for the other lines of the band management table 62) in the examination of the second object B, the printer 10 judges that the smallest rectangular area does not overlap with the overlap rectangular area (S38: NO) and advances to the step S40.

In the step S39, the printer 10 turns the overlap flag in the N-th line of the band management table 62 "ON". In the step S40, the printer 10 updates the overlap rectangular area (registered in the N-th line of the band management table 62) which has been explained above. Specifically, the overlap rectangular area regarding the objects to be drawn in the N-th band is specified by use of coordinates. After finishing the step S40, the "object registration" subroutine of FIG. 10 is ended.

The above "object registration" subroutine (in units of bands) is executed for all the objects included in the PDL data 60.

Figure 11:
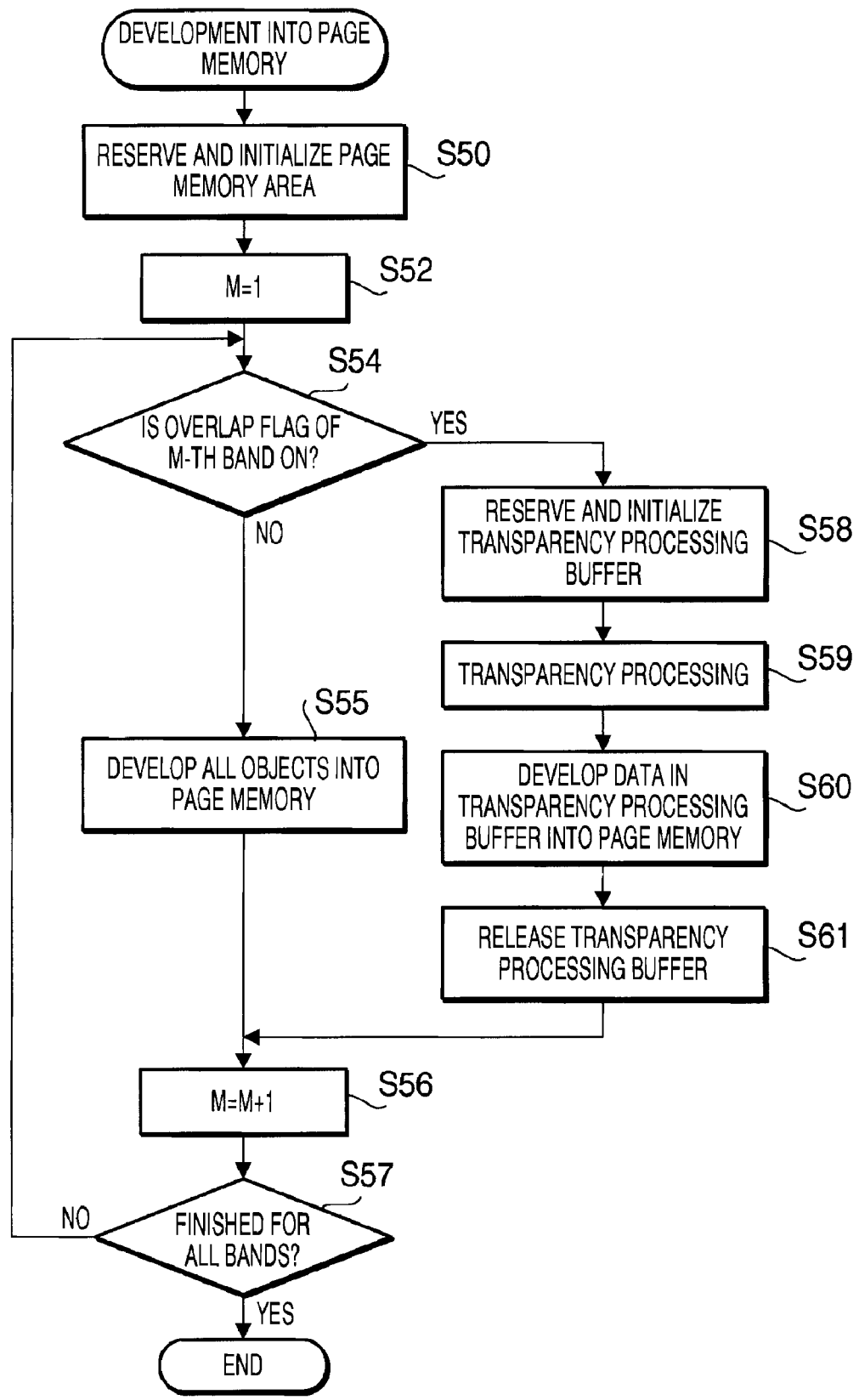
FIG. 11 is a flow chart of the "development into page memory" subroutine (S10 in FIG. 6) executed by the printer of the second embodiment.

Next, the "development into page memory" subroutine which is executed in the step S10 in FIG. 6 will be described in detail. FIG. 11 is a flow chart of the "development into page memory" subroutine in the second embodiment. In the subroutine of FIG. 11, the intermediate data of the PDL data 60 stored in the intermediate data storage area 61 are processed properly based on the information registered in the band management table 62. When the transparency processing is necessary for intermediate data for a band, the transparency processing is executed to the intermediate data by use of the transparency processing buffer 63*a*. When the transparency processing is unnecessary for intermediate data for a band, the intermediate data is directly binarized and developed into the page memory. The flow of the subroutine of FIG. 11 differs from that in the first embodiment (FIG. 8) since the information registered in the band management table 62 differs from that in the first embodiment.

In step S50, the printer 10 reserves an area for the page memory area 64 in the RAM 23 and initializes the page memory area 64. In the next step S52, the printer 10 initializes the band counter M to 1. In the next step S54, the printer 10 checks the overlap flag regarding the M-th band which has been registered in the band management table 62. For example, when the band counter M is 1, the printer 10 checks the overlap flag registered in the first line 62*a* of the band management table 62. When the overlap flag is ON (S54: YES), the printer 10 advances to step S58. When the overlap flag remains OFF (S54: NO), the printer 10 advances to step S55.

In the step S55, the printer 10 develops all the objects registered in the M-th line of the band management table 62 (M: band counter value) directly into the page memory area 64. Specifically, when the band counter M is 1, the printer 10 refers to the first line 62*a* of the band management table 62, recognizes that the second object B has been registered, and develops the part of the second object B to be drawn in the first band 64*a* directly into the first band 64*a* of the page memory area 64. Meanwhile, when the band counter M is 4, the printer 10 refers to the fourth line 62*d* of the band management table 62, recognizes that the first object A has been registered, and develops the part of the first object A to be drawn in the fourth band 64*d* directly into the fourth band 64*d* of the page memory area 64.

In the next step S56, the printer 10 increments the band counter M by 1. In the next step S57, the printer 10 checks whether the band process (the loop of S54-S56) has been finished for all the bands 64*a*-64*e*. Specifically, the printer 10 compares the band counter M with the total number of bands and judges that the band process has been finished for all the bands (S57: YES) when the band counter M has exceeded the total number of bands. In this case (S57: YES), the "development into page memory" subroutine of FIG. 11 is ended. When the band counter M has not exceeded the total number of bands, the printer 10 judges that the band process has not been finished for all the bands (S57: NO) and returns to the step S54.

In the step S58 which is executed when the overlap flag is ON (S54: YES), the printer 10 reserves an area for the transparency processing buffer 63*a* in the RAM 23 and initializes the transparency processing buffer 63*a*.

In the next step S59, the printer 10 executes the transparency processing to the objects managed in the M-th line of the band management table 62. In the second embodiment, the overlap flag in the third line 62*c* is ON, and thus the printer 10 executes the transparency processing for the third band 64*c*.

In the next step S60, the printer 10 develops the data obtained in the transparency processing buffer 63*a* by the transparency processing into the page memory area 64. In the second embodiment, the development of S60 is executed into the third band 64*c* only. In the next step S61, the printer 10 releases the transparency processing buffer 63*a* which has occupied part of the RAM 23. Thereafter, the printer 10 advances to the step S56.

Incidentally, while the size of the transparency processing buffer 63*a* in the second embodiment is set based on that of each band, the size may also be set based on that of the overlap rectangular area.

For example, when the transparency processing buffer 63*a* is reserved in the RAM 23 in S58 when the band counter M is 3, the transparency processing buffer 63*a* may be reserved not in a size corresponding to that of the band managed in the third line 62*c* of the band management table 62 but in a size corresponding to that of the overlap rectangular area in the third band 64*c*. In other words, the printer 10 may reserve an area necessary for the transparency processing for a (10, 20)-(40, 28) area (overlap rectangular area) instead of reserving an area necessary for the transparency processing for a (0, 20)-(50, 30) area (third band 64*c*).

In this case, the transparency processing of S59 is executed for the overlap rectangular area only, in a transparency processing buffer 63*a* having the size set based on that of the overlap rectangular area. In the step S60, the printer 10 develops the data obtained in the transparency processing buffer 63*a* by the transparency processing into a page memory area 64 corresponding to the overlap rectangular area.

The second embodiment described above has the following advantages. The printer 10 of the second embodiment configured as above divides the page memory area 64 into multiple bands and executes the transparency processing in units of bands, by which the size of the area in the RAM 23 occupied by the transparency processing buffer can be reduced similarly to the first embodiment.

The principal difference from the first embodiment is the band management table 62 modified to be capable of managing the overlap rectangular area and the overlap flag.

When the transparency processing buffer 63a based on the band size is used, there is no significant difference between the effects of the first and second embodiments since the first and second objects A and B included in the PDL data 60 actually overlap with each other in the third band 64c both in the first and second embodiments. However, a difference arises between the effects of the embodiments when the coordinates of the first and second objects A and B are apart from each other and there is no overlapping part between the two objects.

While the transparent object presence/absence information in the first embodiment is set "ON" when the second object B has the transparent property, there is actually no guarantee that the first and second objects A and B overlap with each other. Thus, the transparency processing in the first embodiment is executed even when the two objects have no overlapping part, that is, useless transparency processing steps can occur in the first embodiment.

The second embodiment resolves the problem by managing the actual drawing positions of the objects in each band in terms of the overlap rectangular area.

Specifically, an overlap between the first and second objects A and B is detected in each band in the step S38 in FIG. 10 by comparing the rectangular areas representing the first and second objects A and B and detecting an overlap between the rectangular areas in the band. In this case, the overlap flag of a band needing the transparency processing is necessarily set "ON" in the step S39.

By examining the rectangular areas and managing the overlap flag of each band in the band management table 62 as above, the useless execution of the transparency processing can be avoided and consequently, the printing time of PDL data 60 can be reduced. The effectiveness of the second embodiment becomes more significant as the number of objects increases since the transparency processing of a large number of objects takes an extremely long time.

Further, the memory conservation and high-speed processing achieved by the second embodiment can be enhanced by setting the size of the transparency processing buffer 63a based not on the band size but on the size of the overlap rectangular area as mentioned above.

This advantage can be understood clearly in the aforementioned example of the transparency processing executed for the first and second objects A and B managed in the third line 62c of the band management table 62. When the transparency processing is executed using the transparency processing buffer 63a in the size based on the band size, an area enough for processing the (0, 20)-(50, 30) area (third band 64c) has to be reserved in the RAM 23. Meanwhile, the transparency processing using the transparency processing buffer 63a in the size based on that of the overlap rectangular area requires only an area for processing the (10, 20)-(40, 28) area (overlap rectangular area), by which the size of the area reserved in the RAM 23 can be reduced considerably.

By the reduction of the occupancy ratio of the transparency processing buffer 63a in the RAM 23, memory-saving program execution becomes possible. The number of calculations for the transparency processing and the amount of data developed into the page memory are reduced thanks to the reduced area of the transparency processing. Consequently, the processing speed can be increased further.

Third Embodiment

In the following, a printer 10 as a printing device in accordance with a third embodiment of the present invention will be described. In the third embodiment, the basic configuration of the printer 10 is identical with that in the first embodiment (see FIGS. 1 and 2), and the basic flow and the "object registration" subroutine are identical with those in the second embodiment (see FIGS. 6 and 10), and thus repeated explanation thereof is omitted here.

Figure 12:
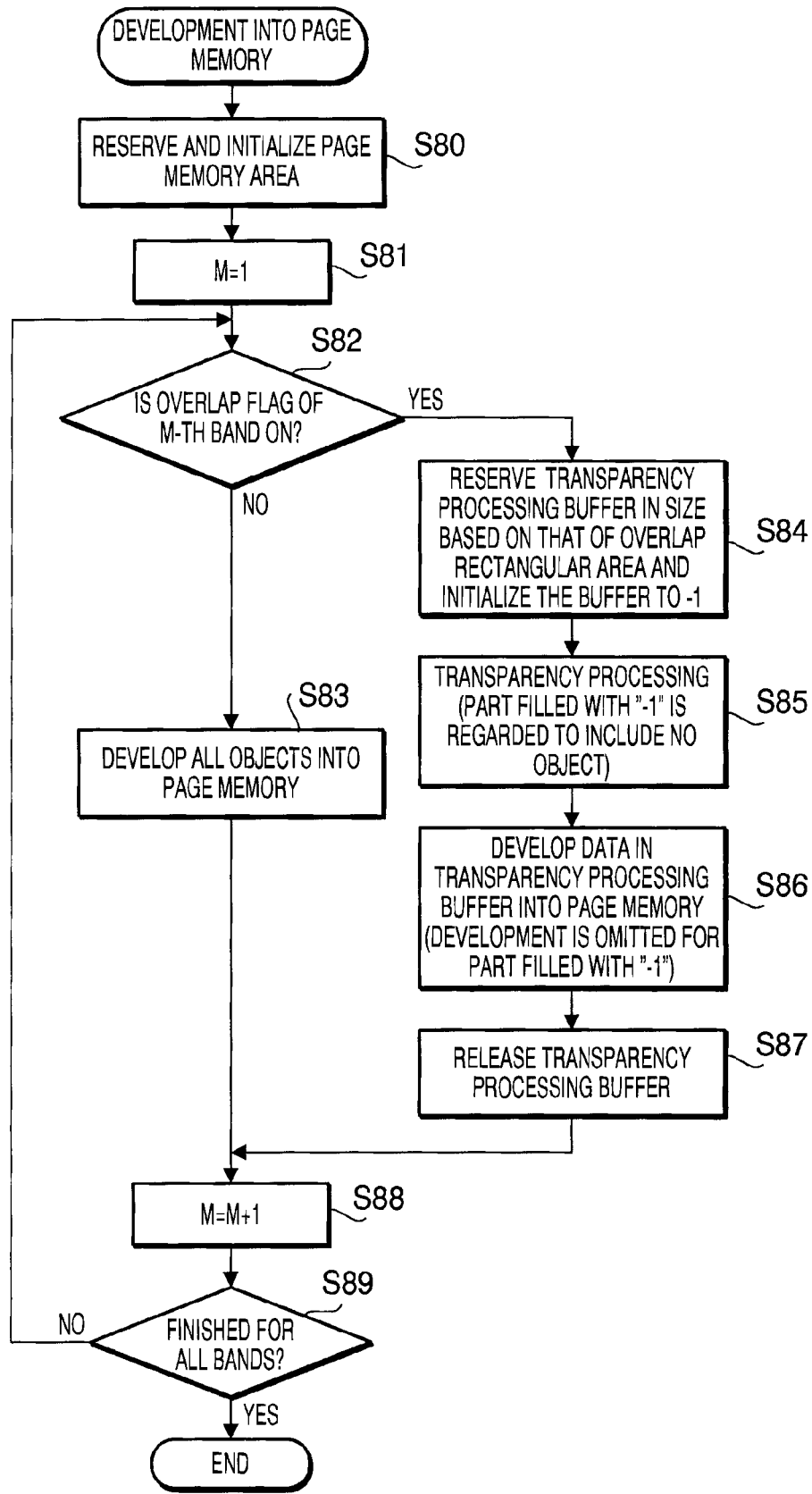
FIG. 12 is a flow chart of the "development into page memory" subroutine (S10 in FIG. 6) executed by a printer as a printing device in accordance with a third embodiment.

The difference from the second embodiment is the "development into page memory" subroutine. The difference will be explained below. FIG. 12 is a flow chart of the "development into page memory" subroutine in the third embodiment. While the flow of FIG. 12 is basically identical with that of FIG. 11 (second embodiment), the steps S58-S60 in FIG. 11 are modified in FIG. 12. Therefore, the following explanation will be given about the different steps only.

In step S84 (corresponding to S58 in FIG. 11), the printer 10 reserves a transparency processing buffer 63a in a size that is set based on that of the overlap rectangular area registered in the M-th line (M: band counter value) of the band management table 62.

For example, at the point when the transparency processing is executed for the third band 64c of the page memory area 64 when the band counter M is 3, the drawing information about the first object A and the second object B (transparent object) has been stored in the corresponding third line 62c of the band management table 62. In this case, the overlap rectangular area in the third band 64c is the (10, 20)-(40, 30) area as shown in FIG. 9 since the rectangular area of the first object A is the (10, 20)-(40, 28) area and that of the second object B is the (20, 21)-(25, 30) area. Thus, the transparency processing buffer 63a is reserved in the size based on that of the overlap rectangular area.

Subsequently, the printer 10 initializes the transparency processing buffer 63a. In the initialization of S84, all the values in the transparency processing buffer 63a are initialized to "−1" differently from the step S58 in FIG. 11. The initial value is not particularly restricted to "−1"; a value other than 0-255 (in decimal notation) is used as the initial value when each piece of data in the transparency processing buffer 63a is expressed by 8 bits.

In the next step S85 (corresponding to S59 in FIG. 11), the printer 10 executes the transparency processing for the M-th band using the transparency processing buffer 63a. The difference from S59 in FIG. 11 is that each area in the transparency processing buffer 63a filled with values "−1" is regarded to include no object.

For example, when the band counter M is 3, the printer 10 first draws the first object A in a corresponding part of the transparency processing buffer 63a, by which the values in the part are changed from the initial value "−1". Subsequently, the printer 10 executes the transparency processing of the second object B (transparent object), in which the printer 10 judges that there exists an object overlapping with the second object B and executes the transparency processing when a part of the transparency processing buffer 63a corresponding to the second object B includes a value other than "−1". On the other hand, when the part of the transparency processing buffer 63a corresponding to the second object B includes values "−1" only, the printer 10 executes the processing considering that there exists no object overlapping with the second object B in the third band 64c (omits the substantial part (color mixing, etc.) of the transparency processing). Incidentally, the aforementioned part of the transparency processing buffer 63a corresponding to the first object A is assumed to have been filled with values other than "−1" in this example.

Subsequently, the printer 10 draws the second object B in the corresponding part of the transparency processing buffer 63a.

In the next step S86 (corresponding to S50 in FIG. 11), the printer 10 develops the data obtained in the transparency processing buffer 63a (regarding the M-th band for which the transparency processing of S85 has been finished) into the M-th band of the page memory area 64. Incidentally, since the values remain "−1" in a part of the transparency processing buffer 63a where no object has been drawn yet in the transparency processing of S85, the development into the page memory area 64 is unnecessary for the part having the values "−1" (i.e. for the part including no object). After finishing S86, the printer 10 advances to step S87 which is equivalent to the step S61 in FIG. 11.

The third embodiment described above has the following advantages. The printer 10 of the third embodiment configured as above divides the page memory area 64 into multiple bands and executes the transparency processing in units of bands, by which the size of the area in the RAM 23 occupied by the transparency processing buffer can be reduced similarly to the first and second embodiments.

The principal difference from the second embodiment is the definition of the values "−1" (initial value) in the data area of the transparency processing buffer 63a. As mentioned above, the initial value is not restricted to "−1" and can be set at an arbitrary value outside the color range (e.g. value other than 0-255 (in decimal notation) when each piece of data is 8-bit data for the 256-step gradation).

Incidentally, when the transparency processing buffer 63a is managed by use of 8-bit data (0-255 in decimal notation), only 255-step gradation is possible for color expression since one step (particular 8-bit data) has to be used as the value outside the color range. On the other hand, when the 256-step gradation is fully used for color expression, the transparency processing buffer 63a is managed by use of 9-bit data or higher.

In general, the initial value of a transparency processing buffer 63 for the transparency processing is set at "0" since the value "0" represents true white in the CMYK-based coloring. In this case, the values in the part of the transparency processing buffer 63 with no object remain "0" and the values still remain "0" (true white) even after the development of the object data into the page memory, which causes no problem.

However, when a transparent object is stacked on a white object, the transparent object can be affected by the white object depending on the calculation method used for the transparency processing (e.g. in cases where the transparency processing is executed using a color obtained by inverting the color of the object placed as the background).

In such cases, the setting of the initial value of the transparency processing buffer 63 at "0" results in incorrect transparency processing since it is impossible to judge whether the value "0" represents the initial value or the color of a white object.

In this regard, the aforementioned setting of the initial value of the transparency processing buffer 63 at a value outside the color range eliminates the above problem and has the advantage of realizing correct transparency processing.

Further, in the development into the page memory area 64, the development is unnecessary for the part still holding the initial value (e.g. "−1"). By the omission of the development of such parts, the processing speed can be increased further.

Fourth Embodiment

In the following, a printer 10 as a printing device in accordance with a fourth embodiment of the present invention will be described. In the fourth embodiment, the basic configuration of the printer 10 is identical with that in the first embodiment (see FIGS. 1 and 2), and the basic flow and the "object registration" subroutine are identical with those in the second and third embodiments (see FIGS. 6 and 10), and thus repeated explanation thereof is omitted here.

Figure 13:
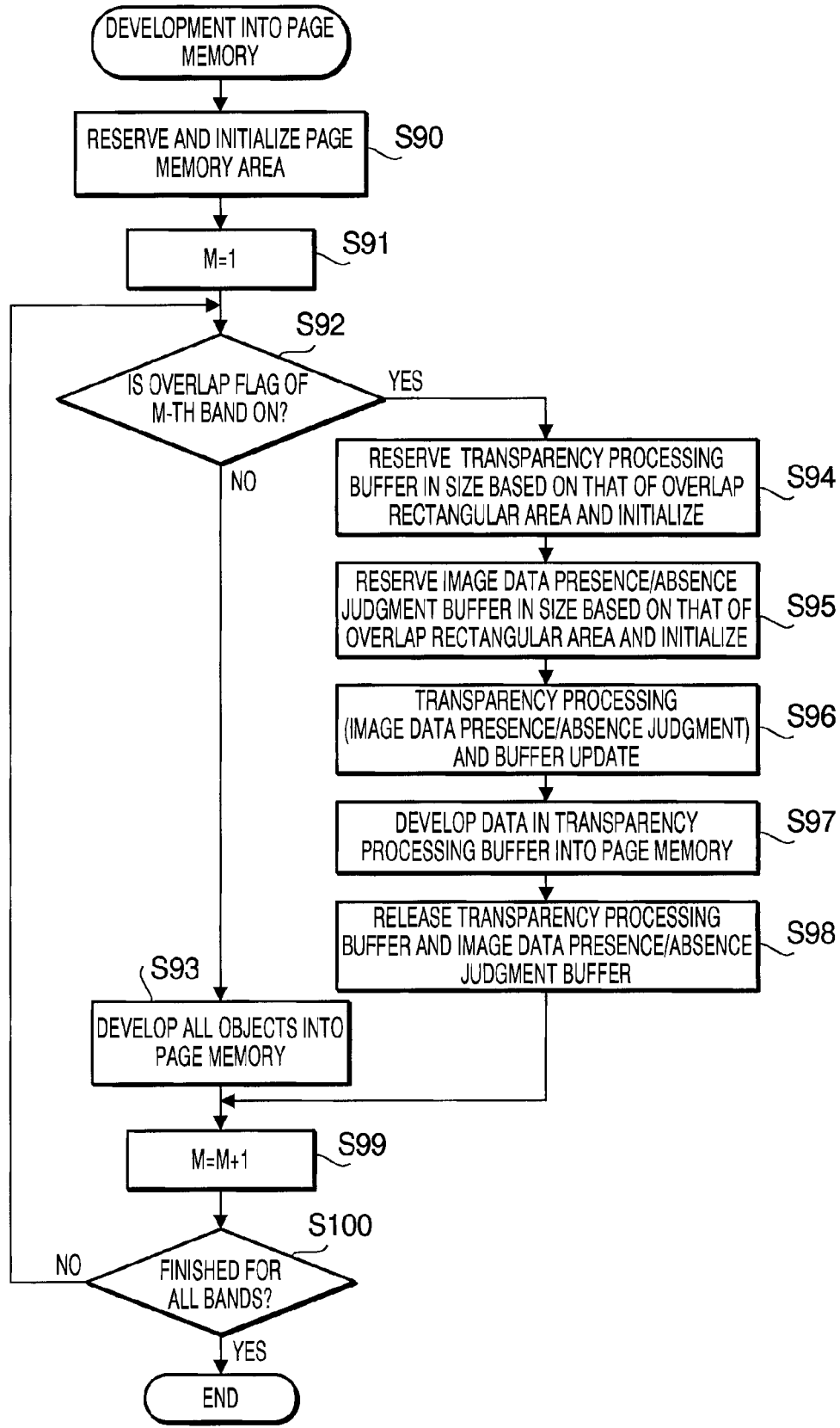
FIG. 13 is a flow chart of the "development into page memory" subroutine (S10 in FIG. 6) executed by a printer as a printing device in accordance with a fourth embodiment.
Figure 15:
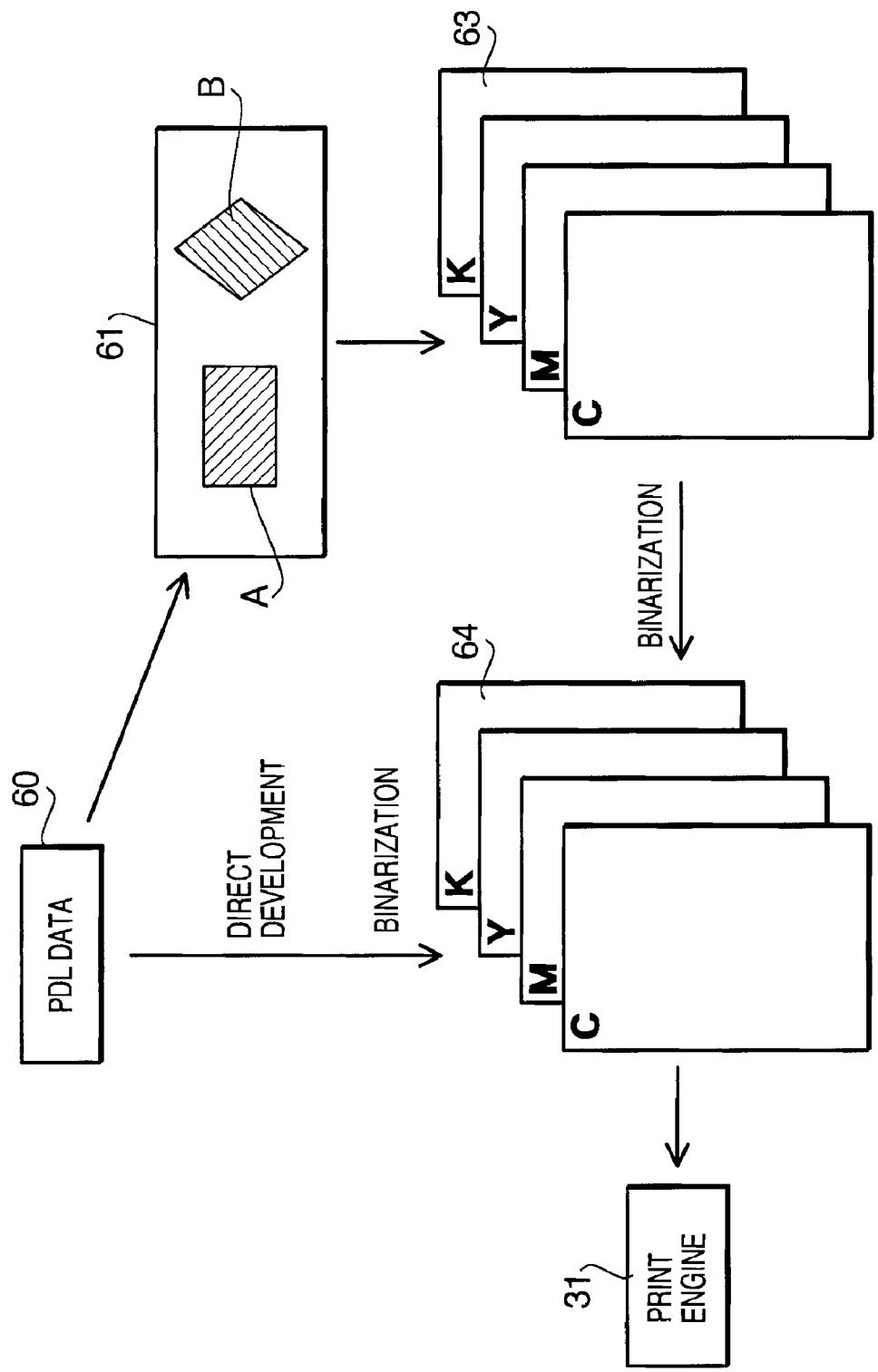
FIG. 15 is a conceptual diagram showing tasks executed in transparency processing of PDL data.

The difference from the third embodiment is a part of the "development into page memory" subroutine. The difference will be explained below. FIG. 13 is a flow chart of the "development into page memory" subroutine in the fourth embodiment.

While the flow of FIG. 13 is basically identical with that of FIG. 12 (third embodiment), steps S94-S98 in FIG. 13 differ from corresponding steps in FIG. 12. Therefore, the following explanation will be given about the different steps only.

In step S94 (corresponding to S84 in FIG. 12), the printer 10 reserves a transparency processing buffer 63a in a size that is set based on that of the overlap rectangular area registered in the M-th line of the band management table 62 and initializes the transparency processing buffer 63a. The difference from S84 in FIG. 12 is that the initial value of the transparency processing buffer 63a is set at "0" similarly to the first and second embodiments.

In the next step S95 (also corresponding to S84 in FIG. 12), the printer 10 reserves an image data presence/absence judgment buffer 63b (unshown) in a size that is set based on that of the overlap rectangular area registered in the M-th line of the band management table 62 and initializes the image data presence/absence judgment buffer 63b.

In the image data presence/absence judgment buffer 63b, "data presence/absence information", indicating whether there exists an object (object data) that has been written into each part of the transparency processing buffer 63a corresponding to each address of the page memory area 64 or not (finally indicating whether there exists image data to be stored in (developed into) each address of the page memory area 64 or not), is stored. Specifically, by initializing the values in the image data presence/absence judgment buffer 63b to "0" and thereafter giving a value "1" to each part of the image data presence/absence judgment buffer 63b where the first object A or the second object B exists, each part of the image data presence/absence judgment buffer 63b with no object retains the initial value "0". Therefore, whether image data to be drawn at each address of the page memory area 64 exists or not can be judged by referring to the image data presence/absence judgment buffer 63b.

Even though the printer 10 of the fourth embodiment has to have an extra buffer (image data presence/absence judgment buffer 63b) in addition to the transparency processing buffer 63a, the increase in the occupancy ratio of the RAM 23 can be minimized since the image data presence/absence judgment buffer 63b has only to hold binary data (1-bit data) representing the data presence/absence information indicating whether image data to be drawn at each address of the page memory area 64 exists or not (which can be shared among the four colors CMYK) whereas the transparency processing buffer 63a has to hold a large amount of 8-bit data enough for the four layers corresponding to CMYK.

In the next step S96 (corresponding to S85 in FIG. 12), the printer 10 executes the transparency processing for the M-th band using the transparency processing buffer 63a, while also updating the image data presence/absence judgment buffer 63b. The difference from S85 in FIG. 12 is that the values of the data presence/absence information (stored in the image data presence/absence judgment buffer 63b) corresponding to an object newly drawn in the transparency processing buffer 63a are updated to "1", for example.

For example, when the band counter M is 3, the printer 10 first draws the first object A in a corresponding part of the transparency processing buffer 63a and changes the values of the data presence/absence information corresponding to the part (i.e. corresponding to the first object A) to "1". Subsequently, the printer 10 executes the transparency processing of the second object B (transparent object), in which the printer 10 judges that there exists an object overlapping with the second object B in the third band 64c and executes the transparency processing when a part of the image data presence/absence judgment buffer 63b corresponding to the part of the second object B in the third band 64c includes the value (data presence/absence information) "1". On the other hand, when the part of the image data presence/absence judgment buffer 63b corresponding to the part of the second object B in the third band 64c includes values "0" only, the printer 10 executes the processing considering that there exists no object overlapping with the second object B in the third band 64c (omits the substantial part (color mixing, etc.) of the transparency processing). In this example, the part of the image data presence/absence judgment buffer 63b corresponding to the part of the second object B in the third band 64c includes the value "1".

Subsequently, the printer 10 draws the second object B in the corresponding part of the transparency processing buffer 63a, while also updating the values of the data presence/absence information in the corresponding part of the image data presence/absence judgment buffer 63b to "1".

In the next step S97 (corresponding to S86 in FIG. 12), the printer 10 develops the data obtained in the transparency processing buffer 63a (regarding the M-th band for which the transparency processing of S96 has been finished) into the M-th band of the page memory area 64. In this step, the printer 10 refers to the data presence/absence information stored and updated in the image data presence/absence judgment buffer 63b so far and omits the development into the page memory area 64 in regard to each part with no object.

In the next step S98 (corresponding to S87 in FIG. 12), the printer 10 releases the transparency processing buffer 63a while also releasing the image data presence/absence judgment buffer 63b.

The fourth embodiment described above has the following advantages. The printer 10 of the fourth embodiment configured as above divides the page memory area 64 into multiple bands and executes the transparency processing in units of bands, by which the size of the area in the RAM 23 occupied by the transparency processing buffer can be reduced similarly to the first through third embodiments. While the fourth embodiment has the aforementioned superiority to the second embodiment similarly to the third embodiment, the difference of the fourth embodiment from the third embodiment is the use of the image data presence/absence judgment buffer 63b instead of setting the initial value "−1" to the transparency processing buffer 63a. The image data presence/absence judgment buffer 63b, as a buffer for defining the presence/absence of image data at each address of the page memory area 64, has the same function as the initialization of the transparency processing buffer 63a to "−1" employed in the third embodiment.

However, the fourth embodiment differs from the third embodiment in that the data representing the presence/absence of an object (image data) are held in the image data presence/absence judgment buffer 63b as extra data to be shared among the four colors CMYK. Comparing the third and fourth embodiments assuming that the same color range (the range of values representing the colors of objects) is used in both embodiments, the fourth embodiment is capable of reducing the occupancy ratio of the RAM 23 more since the third embodiment requires extra areas (for storing the values "−1") for all the four layers corresponding to CMYK.

Another difference of the fourth embodiment from the third embodiment is that the printer 10 of the fourth embodiment executes the transparency processing while referring to the image data presence/absence judgment buffer 63b. The printer 10 of the third embodiment executes the transparency processing while referring to the values "−1" (representing the presence/absence of an object) stored in the transparency processing buffer 63a regarding each of the CMYK layers, whereas the printer 10 of the fourth embodiment just refers to the image data presence/absence judgment buffer 63b which is shared among the four colors CMYK. The reduced number of reference points in the fourth embodiment is advantageous for high-speed processing.

While a description has been given above of preferred embodiments in accordance with the present invention, the present invention is not to be restricted by the particular illustrative embodiments and a variety of modifications, design changes, etc. are possible without departing from the scope and spirit of the present invention described in the appended claims.

The flow charts described in the above embodiments are just an example, and thus various modifications can be made to the elements of the flow charts (timing of a counter, usage of a counter, contents of a subroutine, etc.) within the scope and spirit of the present invention.

For example, while the transparency processing buffer is reserved (S29, S58) and released (S32, S61) on each execution of the transparency processing for each band in the flow charts of the "development into page memory" subroutines in the first and second embodiments (FIG. 8, FIG. 11), the reservation and release of the transparency processing buffer each time is unnecessary when the size of the transparency processing buffer necessary for the transparency processing for each band is constant.

In the example of FIG. 4, when the sizes of the first through fifth bands 64a-64e of the page memory area 64 managed by the band management table 62 are all the same, the size of the transparency processing buffer 63a used for the development into the page memory (in units of bands) is constant every time. In this case, the transparency processing buffer 63a may be reserved just once before the first execution of the transparency processing and released just once after the last execution of the transparency processing. Since there is a possibility that the transparency processing (for the development into the page memory) is not executed for the last band, the timing for releasing the transparency processing buffer 63a may be adjusted properly by checking which band undergoes the last transparency processing by referring to information stored in the band management table 62. Whether each band needs the transparency processing or not can be judged based on the transparency flag (in the first embodiment) or the overlap flag (in the second embodiment) stored in the band management table 62.

While the page memory area 64 managed by the band management table 62 is divided into areas (bands) of equal size in the example of FIG. 4, the last area (fifth band 64e) can have a different size when the page memory area 64 can not be divided perfectly into equal sizes. In such cases, it is possible to reserve the transparency processing buffer 63a just once before the first execution of the transparency processing and change the size of the transparency processing buffer 63a at the point when the development into page memory is executed for the last band.

While the intermediate data storage area 61 is reserved in the RAM 23 and used for the data processing in the above description of the first through fourth embodiments, it is also possible to process and develop the object data directly from the PDL data 60 into the transparency processing buffer 63a or the page memory area 64 instead of using the intermediate data storage area 61. While the configurations employing the intermediate data storage area 61 have been described in the embodiments (since the use of the intermediate data storage area 61 can bring the advantage of higher processing speed), the embodiments do not exclude the implementation of the present invention by configurations without the intermediate data storage area 61.

While the band management table 62 is used in the above description of the first through fourth embodiments, it is not necessarily requisite to manage data (information) in the table format as long as data necessary for each process is held in a style available to the printer 10 (CPU 21). Thus, the embodiments do not exclude the possibility of storing/managing such data (managed by the band management table 62 in the embodiments) by use of a different type of unit.

While it has been assumed that the intermediate data storage area 61 and the transparency processing buffer 63a process data of deep bit depth and the page memory area 64 processes data of shallow bit depth in the above description of the first through fourth embodiments, the assumption is not necessarily essential for the implementation of the present invention, since there are cases where objects are expressed by data of deep bit depth in the page memory area 64 and there exist printers processing object data in the intermediate data storage area 61 and the transparency processing buffer 63 as data of shallow bit depth.

Even with such configurations, at least one of the memory conservation and high-speed processing can be achieved, by dividing the page memory area 64 into bands, judging whether the transparency processing is necessary for each band or not, and executing the transparency processing for bands needing it. Therefore, such configurations against the assumption regarding the bit depth do not deviate from the essence of the present invention.

What is claimed is:

1. A printing device, comprising:
   at least one processor; and
   memory operatively coupled to the at least one processor and storing computer readable instructions that, when executed, cause the printing device to provide:
   a print data receiving unit configured to receive print data, the print data including multiple objects and accompanying information corresponding to at least one of the objects;
   a transparent property judgment unit configured to judge whether each of the objects is a transparent object having a transparent property using the accompanying information;
   a transparency processing unit configured to generate transparency-processed data by executing transparency processing on the objects including a transparent object and an object underlying the transparent object;
   a transparency processing buffer configured to store the transparency-processed data generated in the transparency processing;
   an image data generating unit configured to generate image data based on at least one of the transparency-processed data and the objects;
   an image data storage control unit configured to store the image data in a page memory;
   a print engine which prints an image on a print medium using the image data stored in the page memory; and
   an object placement judgment unit configured to handle the page memory as a set of bands defined as prescribed areas and to judge in which bands each of the objects is to be placed by use of the accompanying information,
   wherein a size of the transparency processing buffer corresponds to a size of one band,
   wherein the transparency processing unit is further configured to judge whether to execute the transparency processing for a band based on whether the band is judged by the object placement judgment unit to have at least a part of a transparent object,
   wherein the image data generating unit is further configured to:
      generate, for a band in the page memory corresponding to a transparent object, the image data to be stored in the page memory based on the transparency-processed data stored in the transparency processing buffer, wherein only bands in the page memory having at least part of a transparent object are processed into the transparency processing buffer, and
      generate, for a band in the page memory not corresponding to a transparent object, the image data to be stored in the page memory directly from one or more of the objects without use of the transparency processing buffer.

2. The printing device according to claim 1, wherein:
   the transparency processing unit is further configured to execute the transparency processing for each band satisfying a first condition in which a transparent object recognized by the transparent property judgment unit is judged by the object placement judgment unit to be placed partially or totally in the band, wherein executing the transparency processing includes using objects to be placed partially or totally in the band to generate the transparency-processed data for the band,
   the transparency processing buffer stores the transparency-processed data for each band satisfying the first condition, and
   the image data generating unit generates the image data for each band satisfying the first condition based on the transparency-processed data for the band stored in the transparency processing buffer, while generating the image data for each band not satisfying the first condition by use of objects to be placed partially or totally in the band.

3. The printing device according to claim 2, further comprising a band information storage unit configured to store band information on each band, wherein the band information includes object number information indicating the number of objects judged by the object placement judgment unit to be placed partially or totally in the band and transparent object presence/absence information indicating whether a transparent object recognized by the transparent property judgment unit exists, wherein the transparent object is to be placed partially or totally in the band, wherein:
   the transparency processing unit executes the transparency processing for each band whose band information stored in the band information storage unit indicates that two or more objects are to be placed partially or totally in the band and at least one transparent object is to be placed partially or totally in the band.

4. The printing device according to claim 1, wherein the computer readable instructions, when executed, further cause the printing device to provide:

an overlap judgment unit configured to judge whether a transparent rectangular area, defined as the smallest rectangular area having two X sides parallel to one side of the image and two Y sides orthogonal to the X sides and surrounding all parts of transparent objects situated inside a band, overlaps with a base rectangular area defined as the smallest rectangular area having two X sides and two Y sides and surrounding all parts of non-transparent objects situated inside the band, wherein the overlap judgment unit is configured to judge each band using the accompanying information and the judgment by the object placement judgment unit, wherein:

the transparency processing unit executes the transparency processing for each band satisfying a second condition in which the transparent rectangular area in the band is judged by the overlap judgment unit to overlap with the base rectangular area in the band, the transparency processing being executed by use of objects to be placed partially or totally in the band to generate the transparency-processed data for the band, and the transparency processing buffer stores the transparency-processed data for each band satisfying the second condition, and the image data generating unit generates the image data for each band satisfying the second condition based on the transparency-processed data for the band stored in the transparency processing buffer, while generating the image data for each band not satisfying the second condition by using objects to be placed partially or totally in the band.

5. The printing device according to claim 4, wherein the computer readable instructions, when executed, further cause the printing device to provide a band information storage unit configured to store, for each band, an overlap flag indicating whether the transparent rectangular area overlaps with the base rectangular area according to the judgment by the overlap judgment unit, wherein:

the transparency processing unit executes the transparency processing for each band whose overlap flag stored in the band information storage unit indicates that the transparent rectangular area overlaps with the base rectangular area.

6. The printing device according to claim 4, wherein the transparency processing buffer is reserved just before the transparency processing is started for each band by the transparency processing unit and released just after the transparency processing is finished for each band by the transparency processing unit.

7. The printing device according to claim 4, wherein the computer readable instructions, when executed, further cause the printing device to provide a transparency processing buffer reserving unit configured to reserve the transparency processing buffer based on a size of an overlap rectangular area, the overlap rectangular area including both the transparent rectangular area and the base rectangular area, wherein:

the transparency processing unit executes the transparency processing for each band satisfying the second condition by using objects to be placed partially or totally in the band to generate transparency-processed data only for the overlap rectangular area, the transparency processing buffer stores the transparency-processed data generated only for the overlap rectangular area as the transparency-processed data for each band satisfying the second condition, and the image data generating unit generates the image data for each band satisfying the second condition based on the transparency-processed data of the overlap rectangular area stored in the transparency processing buffer, while generating the image data for each band not satisfying the second condition by use of objects to be placed partially or totally in the band.

8. The printing device according to claim 7, wherein the computer readable instructions, when executed, further cause the printing device to provide a band information storage unit configured to store, for each band, rectangular area information indicating a position and the size of the overlap rectangular area and an overlap flag indicating whether the transparent rectangular area overlaps with the base rectangular area according to the judgment by the overlap judgment unit, wherein:

the transparency processing unit executes the transparency processing for each band whose overlap flag stored in the band information storage unit indicates that the transparent rectangular area overlaps with the base rectangular area, by executing the transparency processing only for the overlap rectangular area based on the rectangular area information, and stores the transparency-processed data obtained by the transparency processing in the transparency processing buffer which has been reserved by the transparency processing buffer reserving unit based on the size of the overlap rectangular area indicated by the rectangular area information.

9. The printing device according to claim 7, wherein the transparency processing buffer reserving unit reserves the transparency processing buffer just before the transparency processing is started for each band by the transparency processing unit and releases the transparency processing buffer just after the transparency processing is finished for each band by the transparency processing unit.

10. The printing device according to claim 4, wherein the computer readable instructions, when executed, further cause the printing device to provide a transparency processing buffer initializing unit configured to initialize the transparency processing buffer by placing, throughout the transparency processing buffer, a value outside a range of values representing possible colors of objects.

11. The printing device according to claim 10, wherein the image data generating unit executes the image data generating process while handling parts of the transparency processing buffer holding the value written by the transparency processing buffer initializing unit as parts where no object exists.

12. The printing device according to claim 4, wherein the computer readable instructions, when executed, further cause the printing device to provide:

an image data presence/absence judgment buffer configured to store data presence/absence information indicating whether an object has been written into each part of the transparency processing buffer corresponding to each address of the page memory; and a data presence/absence information storage control unit configured to update the data presence/absence information stored in the image data presence/absence judgment buffer each time an object is written into the transparency processing buffer, wherein:

the transparency processing unit executes the transparency processing while omitting unnecessary steps of the transparency processing for parts of the transparency processing buffer into which no object has been written so far based on the data presence/absence information stored in the image data presence/absence judgment buffer, and the image data generating unit executes the image data generating process while omitting the process for parts of the transparency processing buffer with no object based on the data presence/absence information stored in the image data presence/absence judgment buffer.

13. A non-transitory computer readable medium having computer readable instructions stored thereon, which, when executed by a processor of a printing device, configures the printing device to perform:
- a print data receiving step of receiving print data, the print data including multiple objects and accompanying information corresponding to at least one of the objects, inputted from an external source;
- a transparent property judgment step of judging whether each of the objects is a transparent object having a transparent property using the accompanying information corresponding to the object;
- a transparency processing step of executing transparency processing of the objects, including a transparent object and an object underlying the transparent object, to generate transparency-processed data in a transparency processing buffer;
- an image data generating step of generating image data based on the transparency-processed data or the objects;
- an image data storage control step of storing the image data in a page memory separate from the transparency processing buffer;
- a printing step of printing an image on a print medium using a print engine and the image data stored in the page memory; and
- an object placement judgment step of handling the page memory as a set of bands defined as prescribed areas and judging in which bands each of the objects is to be placed by use of the accompanying information,
- wherein a size of the transparency processing buffer corresponds to a size of one band,
- wherein the transparency processing step includes a step of judging whether to execute the transparency processing for a band based on whether the band is judged by the object placement judgment step to have at least a part of a transparent object, and
- wherein the image data generating step includes:
  - generating, for a band in the page memory corresponding to a transparent object, the image data to be stored in the page memory based on the transparency-processed data stored in the transparency processing buffer, wherein only bands in the page memory having at least part of a transparent object are processed into the transparency processing buffer and
  - generating, for a band in the page memory not corresponding to a transparent object, the image data to be stored in the page memory directly from one or more of the objects without using the transparency processing buffer.

14. The computer readable medium according to claim 13, wherein:
- the transparency processing step executes the transparency processing for each band satisfying a first condition in which a transparent object recognized by the transparent property judgment step is judged by the object placement judgment step to be placed partially or totally in the band, wherein the transparency processing is executed using objects to be placed partially or totally in the band to generate the transparency-processed data for each band, and
- the transparency processing buffer stores the transparency-processed data for each band satisfying the first condition, and
- the image data generating step generates the image data for each band satisfying the first condition based on the transparency-processed data for the band stored in the transparency processing buffer, while generating the image data for each band not satisfying the first condition by using objects to be placed partially or totally in the band.

15. The computer readable medium according to claim 13, wherein execution of the instructions further configures the printing device to perform:
- an overlap judgment step of judging, for each band, whether a transparent rectangular area, defined as the smallest rectangular area having two X sides parallel to one side of the image and two Y sides orthogonal to the X sides and surrounding all parts of transparent objects situated inside a band, overlaps with a base rectangular area defined as the smallest rectangular area having two X sides and two Y sides and surrounding all parts of nontransparent objects situated inside the band, wherein the overlap judgment step performs the step of judging using the accompanying information and the judgment by the object placement judgment step, wherein:
- the transparency processing step executes the transparency processing for each band satisfying a second condition in which the transparent rectangular area in the band is judged by the overlap judgment step to overlap with the base rectangular area in the band, wherein the transparency processing is executed using objects to be placed partially or totally in the band to generate the transparency-processed data for the band, and
- the transparency processing buffer stores the transparency-processed data for each band satisfying the second condition, and
- the image data generating step generates the image data for each band satisfying the second condition based on the transparency-processed data for the band stored in the transparency processing buffer, while generating the image data for each band not satisfying the second condition by use of objects to be placed partially or totally in the band.

* * * * *